(12) United States Patent
Kawana et al.

(10) Patent No.: US 9,405,108 B2
(45) Date of Patent: Aug. 2, 2016

(54) PROJECTION ZOOM LENS AND PROJECTION TYPE DISPLAY DEVICE

(71) Applicant: FUJIFILM Corporation, Tokyo (JP)

(72) Inventors: Masanao Kawana, Saitama-ken (JP); Masaru Amano, Saitama-ken (JP); Yukiko Nagatoshi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/695,479

(22) Filed: Apr. 24, 2015

(65) Prior Publication Data

US 2015/0226947 A1 Aug. 13, 2015

Related U.S. Application Data

(63) Continuation of application No. PCT/JP2013/006615, filed on Nov. 11, 2013.

(30) Foreign Application Priority Data

Nov. 19, 2012 (JP) ................................ 2012-253317

(51) Int. Cl.
*G02B 9/62* (2006.01)
*G02B 15/177* (2006.01)
*G02B 13/04* (2006.01)
(Continued)

(52) U.S. Cl.
CPC ............... *G02B 15/177* (2013.01); *G02B 13/04* (2013.01); *G02B 27/0025* (2013.01); *G02B 13/16* (2013.01); *G02B 13/22* (2013.01); *G02B 27/646* (2013.01)

(58) Field of Classification Search
CPC .. G02B 15/177; G02B 13/04; G02B 27/0025; G02B 13/22; G02B 13/16; G02B 27/646; G02B 13/0045; G02B 9/62
See application file for complete search history.

(56) References Cited

U.S. PATENT DOCUMENTS

2007/0177277 A1 8/2007 Sugita
2007/0223103 A1* 9/2007 Yamamoto ........... G02B 15/177
359/683

(Continued)

FOREIGN PATENT DOCUMENTS

JP 2005-106948 4/2005
JP 2005-292260 10/2005
(Continued)

OTHER PUBLICATIONS

International Search Report, PCT/2013/006615, Mar. 4, 2014.

*Primary Examiner* — Joseph P Martinez
(74) *Attorney, Agent, or Firm* — Young & Thompson

(57) ABSTRACT

A projection zoom lens essentially consists of a negative first lens group, a positive second lens group through the fourth lens group that move along the optical axis while changing magnification, a fifth lens group that moves while changing magnification, and a positive sixth lens group disposed in this order from the magnification side, wherein
the projection zoom lens satisfies conditional formulas (1) and (2) below:

$$1.9 < m4/fw \qquad (1)$$

$$0.7 < (m3+m4)/(m2+m3+m4+m5) \qquad (2),$$

where,
mk (k=2 through 5) is the absolute value of movement of the k-th lens group while changing magnification from the wide angle end to the telephoto end, and
fw: the focal length of the entire system at the wide angle end.

20 Claims, 22 Drawing Sheets

(51) Int. Cl.
*G02B 27/00* (2006.01)
*G02B 27/64* (2006.01)
*G02B 13/16* (2006.01)
*G02B 13/22* (2006.01)

(56) References Cited

U.S. PATENT DOCUMENTS

2008/0231962 A1  9/2008  Yamada
2008/0239507 A1  10/2008  Sugita
2009/0135496 A1  5/2009  Nagahara et al.

FOREIGN PATENT DOCUMENTS

| | | |
|---|---|---|
| JP | 2006-184723 | 7/2006 |
| JP | 2007-206420 | 8/2007 |
| JP | 2007-256424 | 10/2007 |
| JP | 2008-046259 | 2/2008 |
| JP | 2008-242402 | 10/2008 |
| JP | 2009-128683 | 6/2009 |
| JP | 2012-058607 | 3/2012 |

* cited by examiner

FIG.5
EXAMPLE 5
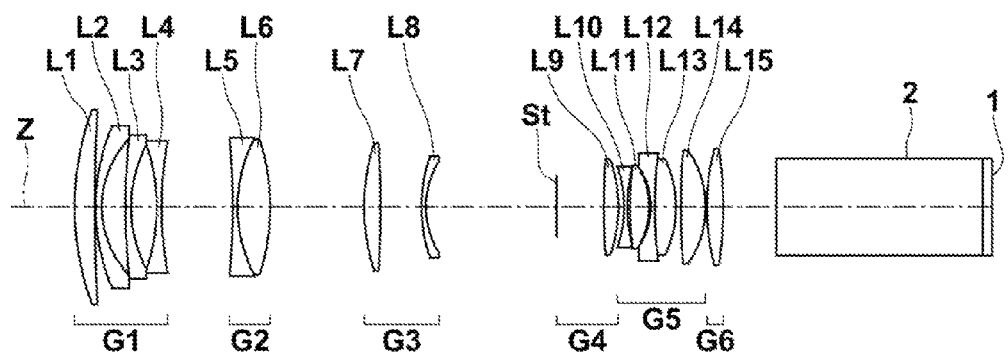
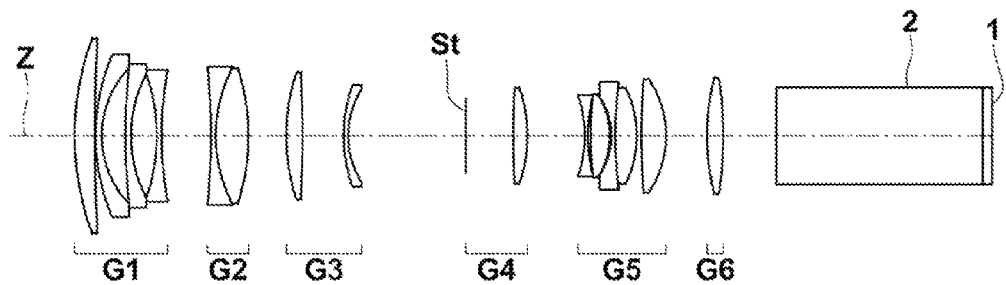
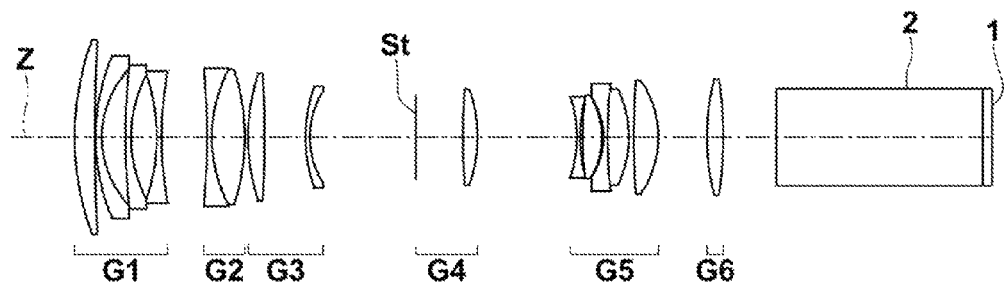

FIG.12
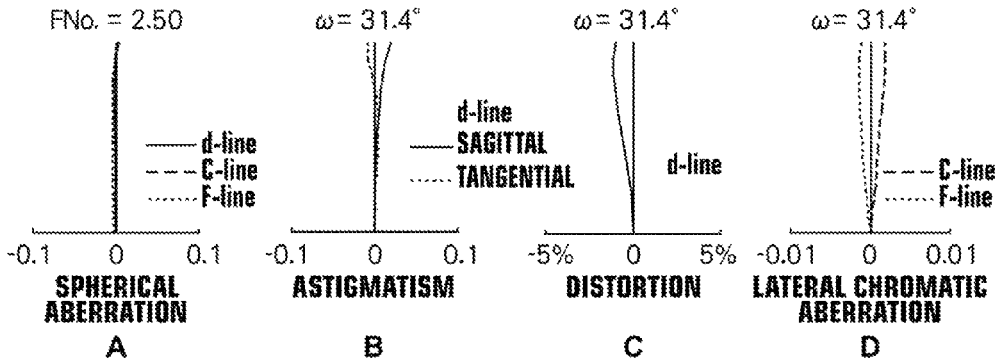
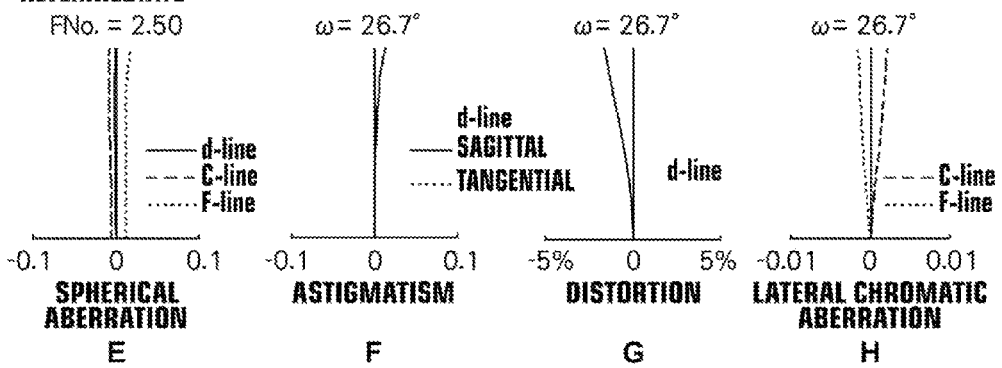
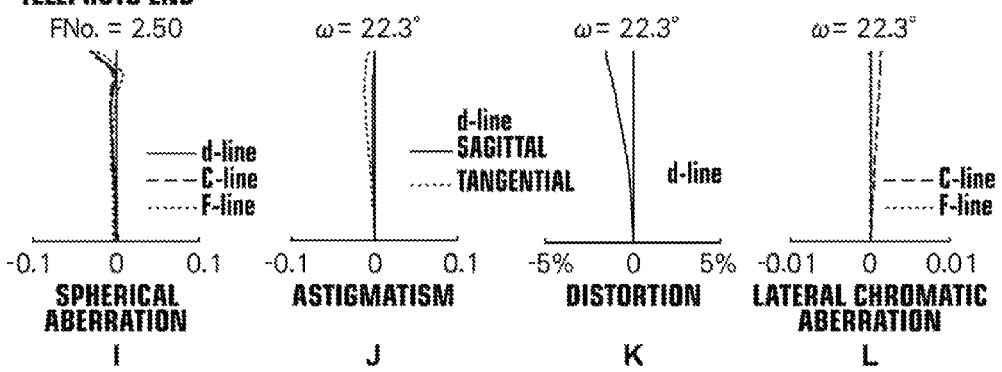

FIG.14
EXAMPLE 4
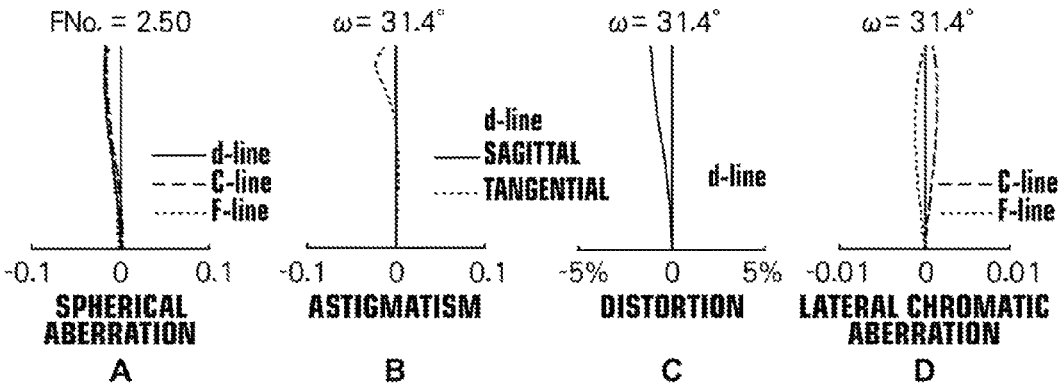
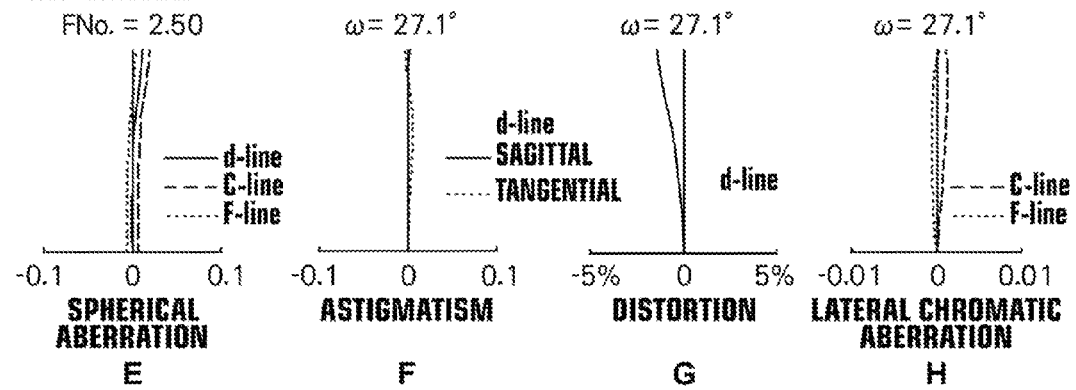
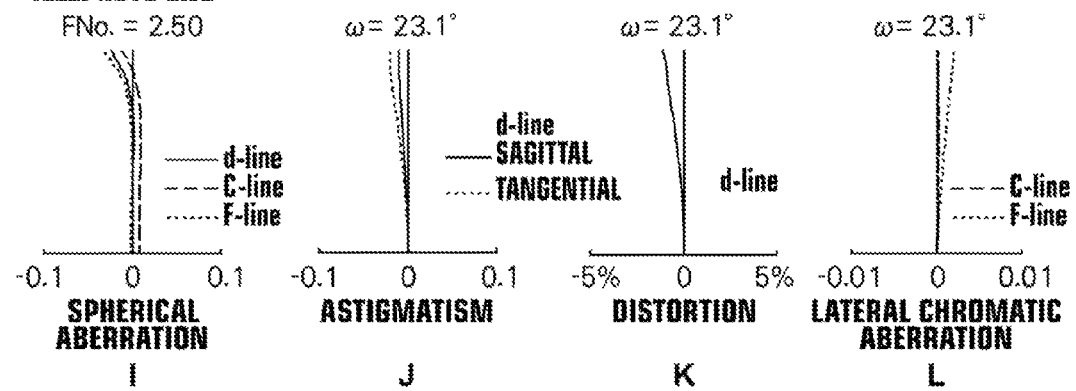

FIG.17
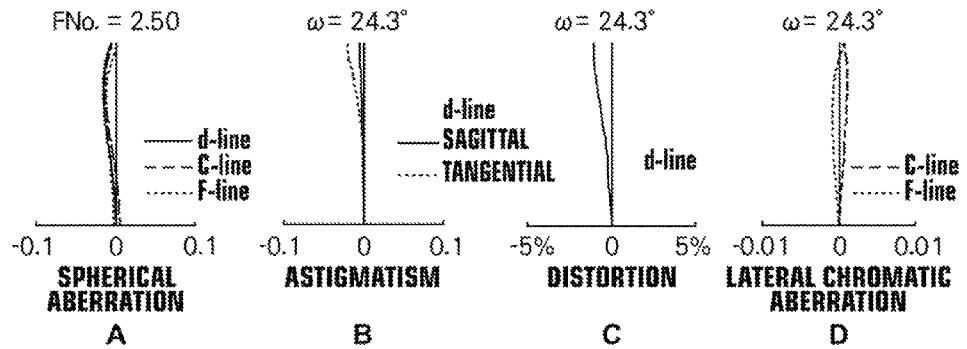
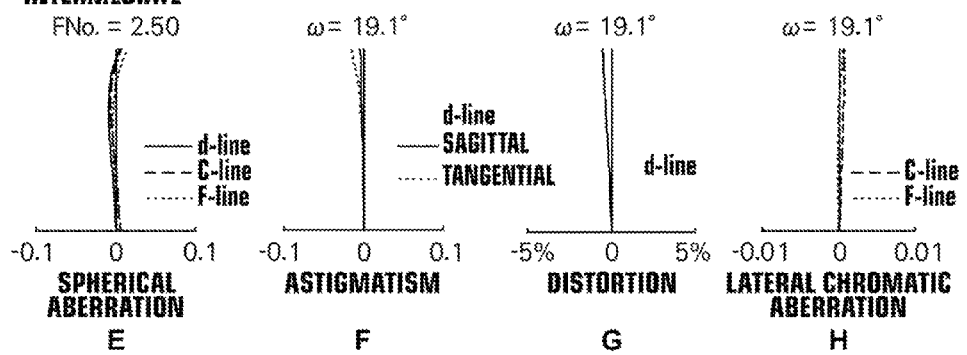
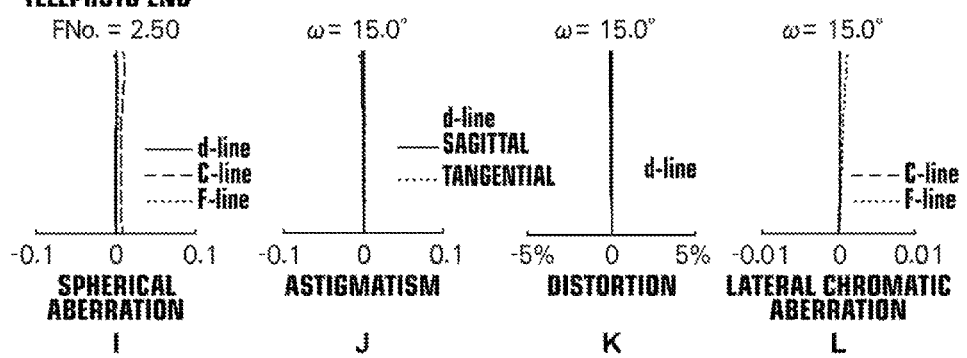

FIG.18
EXAMPLE 8
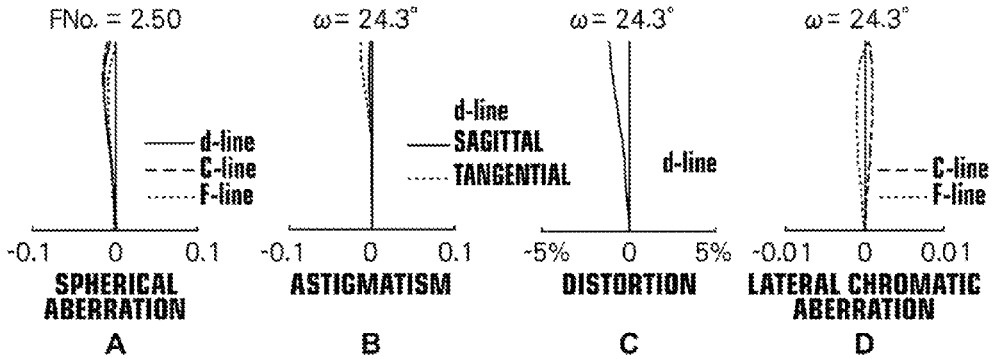
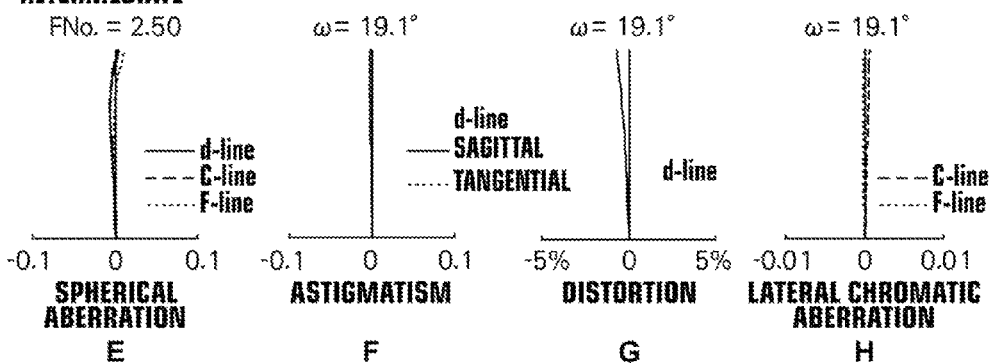
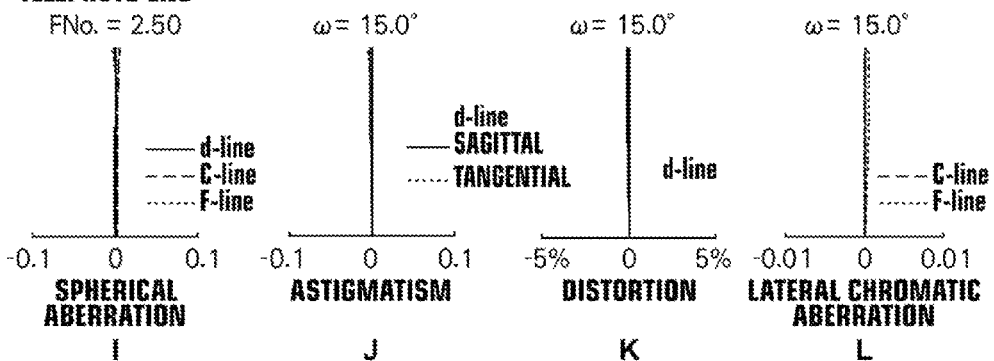

FIG.19
EXAMPLE 9
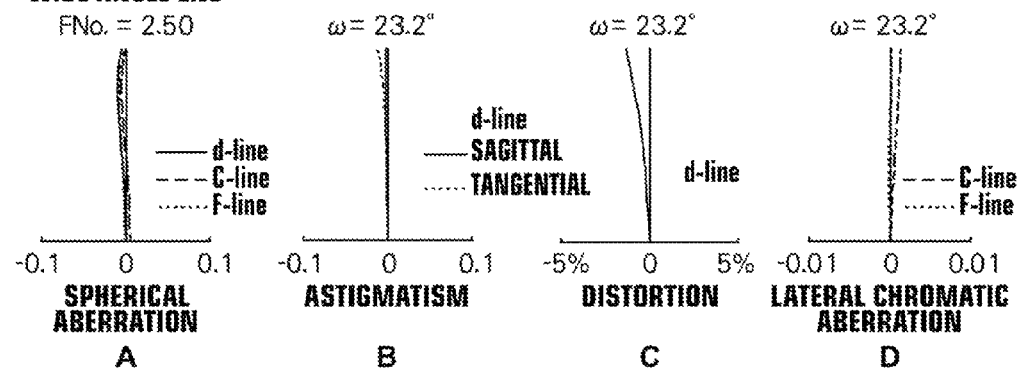
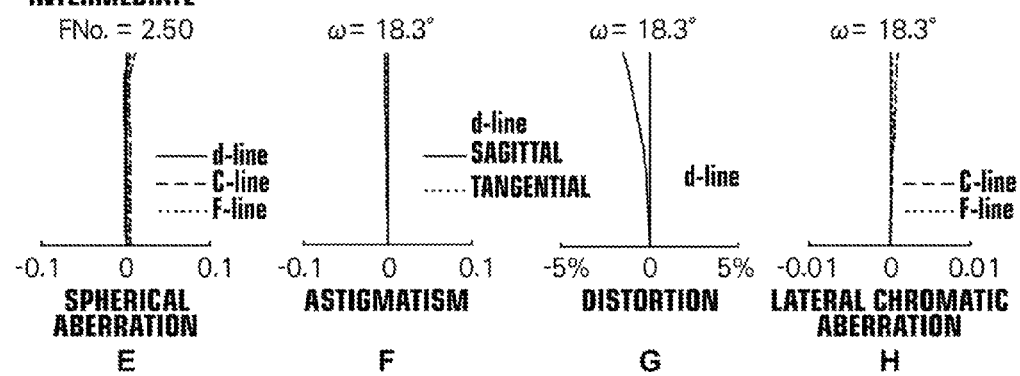
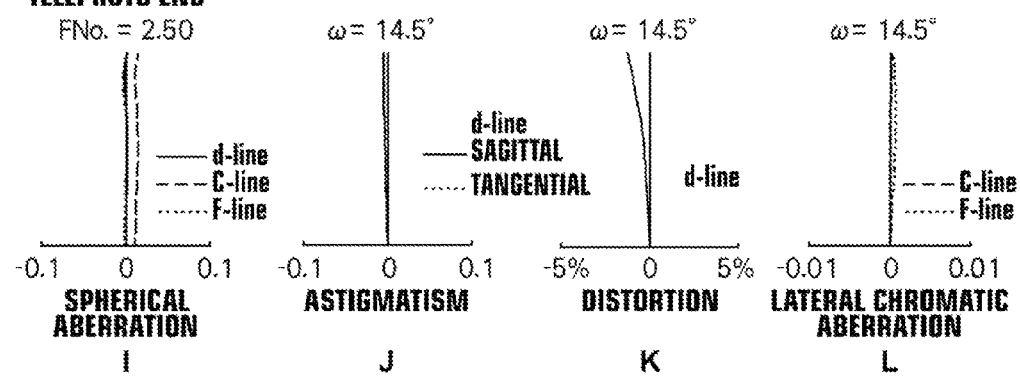

FIG.20
EXAMPLE 10
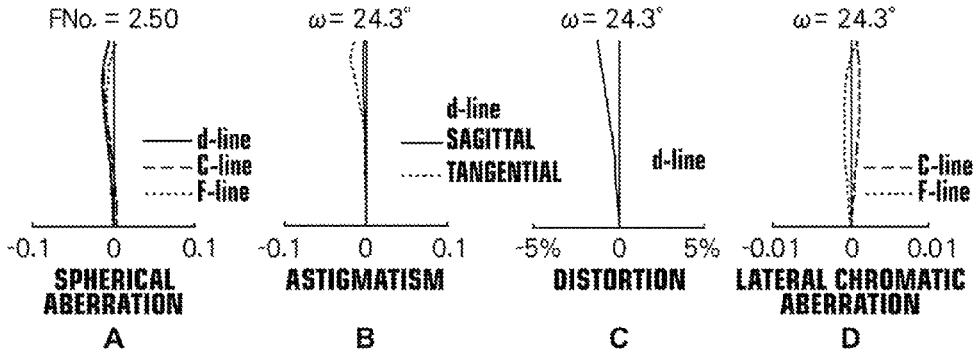
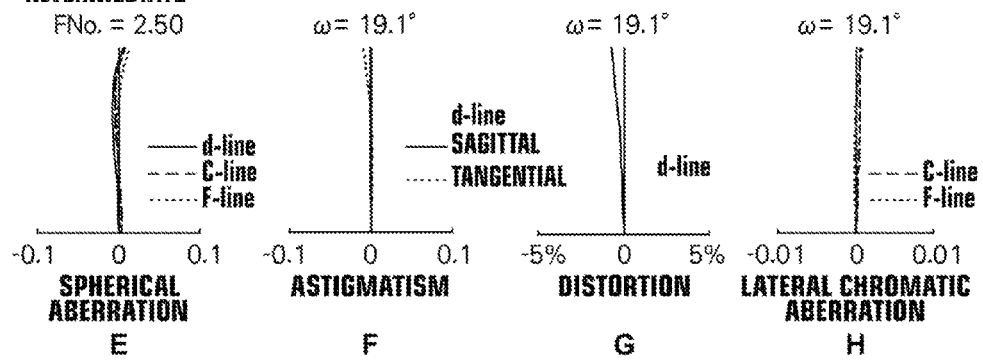
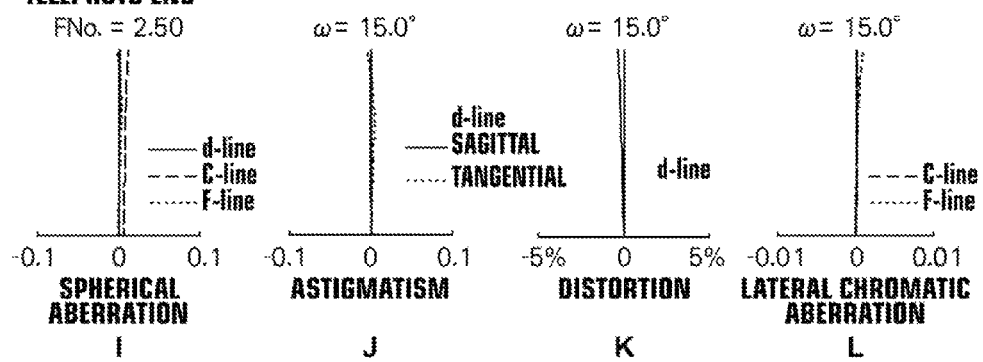

US 9,405,108 B2

PROJECTION ZOOM LENS AND PROJECTION TYPE DISPLAY DEVICE

CROSS-REFERENCE TO RELATED APPLICATIONS

This application is a Continuation of PCT International Application No. PCT/JP2013/006615 filed on Nov. 11, 2013, which claims priority under 35 U.S.C. §119(a) to Japanese Patent Application No. 2012-253317 filed on Nov. 19, 2012, The above application(s) is hereby expressly incorporated by reference, in its entirety, into the present application.

BACKGROUND OF THE INVENTION

1. Field of the Invention

The present invention relates to a zoom lens, and particularly to a projection zoom lens to be applied to a projection type display device.

Further, the present invention relates to a projection type display device equipped with such a projection zoom lens.

2. Description of the Related Art

Conventionally, projection type display devices that utilize light valves, such as liquid crystal display elements, DMD's (Digital Micromirror Device: registered trademark), or the like have been widespread. Further, in recent years, movie theaters and the like have been using such projection type display devices, which are designed to be capable of being applied to large screens and of producing high-definition images. Such projection type display devices to be utilized in movie theaters and the like as described above have been required to have long back focus and a favorable telecentricity.

This is because such projection type display devices adopt a three-plate system in which three light valves for the respective primary colors are provided. In the three-plate system, a light beam from the light source is divided into three primary colors by a color separation optical system, and the separated light of the three colors passes through the respective light valves and then is composed by a color composition optical system to be projected.

Further, such projection type display devices to be utilized in movie theaters and the like have been required to be equipped with high zoom-ratio zoom lenses as a projection lens. This aims at fitting the size of display images to a screen size in accordance with the projection distances and screen sizes, which differ depending on movie theaters, halls, and in accordance with aspect ratios (cinema scope, Vista size) of display images.

Further, there are many cases that such projection zoom lenses are required to maintain constant numerical apertures (hereinafter, referred to as "F number(s)" as well) over the entire zoom range. This is because operating in such a manner can prevent the brightness of display images from changing when the zoom ratios of this type of zoom lens are changed to match the sizes described above.

Further, accompanying the rapid pace of digitalization of cinema screens, projection type display devices have been rapidly miniaturized and reduced in cost. There is likely to be also demand for projection zoom lenses to be miniaturized and reduced in cost in addition to the demands for back focus, telecentricity, and high zoom ratio.

Patent Documents 1 through 5 (Japanese Unexamined Patent Publication No. 2006-184723, Japanese Unexamined Patent Publication No. 2005-106948, Japanese Unexamined Patent Publication No. 2008-046259, Japanese Unexamined Patent Publication No. 2009-128683, and Japanese Unexamined Patent Publication No. 2012-058607) disclose zoom lenses which are intended for use in projection type display devices. More specifically, Patent Document 1 discloses a projection zoom lens of a six-group configuration. In the six-group configuration, a first lens group having a negative refractive power disposed at the most-magnification side and a final lens group having a positive refractive power disposed at the most-reduction side are fixed while changing magnification; and an aperture stop is disposed within a fourth lens group.

Meanwhile, Patent Document 2 discloses a projection zoom lens in which lens groups positioned at the reduction side of the aperture stop are fixed while changing magnification so that a constant numerical aperture is maintained. Further, Patent Document 3 discloses a projection zoom lens in which a first lens group having a negative refractive power disposed at the most-magnification side and a final lens group having a positive refractive power disposed at the most-reduction side are fixed while changing magnification. The projection zoom lens of Patent Document 3 is further configured to maintain a constant numerical aperture over the entire zoom range by using a variable stop that varies the aperture diameter thereof accompanying changes in magnification.

Further, Patent Documents 4 and 5 disclose projection zoom lenses, in which a first lens group having a positive refractive power disposed at the most-magnification side and a final lens group having a positive refractive power disposed at the most-reduction side are fixed while changing magnification, and moving lens groups disposed between these fixed lens groups are caused to move while changing magnification. The projection zoom lenses of Patent Documents 4 and 5 having such a configuration maintain constant numerical apertures over the entire zoom range.

SUMMARY OF THE INVENTION

The projection zoom lens disclosed in Patent Document 1, however, fails to maintain a constant numerical aperture while changing magnification. Further, this projection zoom lens has a short back focus.

The projection zoom lens disclosed in Patent Document 2 is configured to maintain a constant numerical aperture by fixing the lens groups positioned at the reduction side of the aperture stop while changing magnification. The projection zoom lens of Patent Document 2 cannot secure a high zoom ratio sufficient for a projection zoom lens. Further, in projection zoom lenses having such a configuration, the outer diameters of lenses on the magnification side and the total length of the lens system are likely to become long. This tends to make the conditions for installation severe and to increase costs.

Further, the projection zoom lens disclosed in Patent Document 3, which is configured to maintain a constant numerical aperture by using a variable stop, secures a high zoom ratio, but fails to have a sufficiently long back focus. This is disadvantageous from the viewpoint of disposing an optical system with a prism.

Further, in the projection zoom lenses disclosed in Patent Documents 4 and 5, the total lengths and the diameters of lenses of the most-magnification-side lens group are likely to be great. This is because in the projection zoom lenses of Patent Documents 4 and 5, the lens groups positioned at the magnification side of the aperture stop are caused to move and the aperture stop and the lens groups positioned at the reduction side of the aperture stop are fixed so that a constant numerical aperture is maintained.

The present invention has been developed in view of the above circumstances. It is an object of the present invention to provide a projection zoom lens and a projection type display device which can maintain a constant numerical aperture over the entire zoom range and secure a high zoom ratio and sufficiently long back focus.

A first projection zoom lens according to the present invention essentially consisting of a first lens group having a negative refractive power, a second lens group having a positive refractive power that moves along the optical axis while changing magnification, a third lens group having a positive refractive power that moves along the optical axis while changing magnification, a fourth lens group having a positive refractive power that moves along the optical axis while changing magnification, a fifth lens group that moves along the optical axis while changing magnification, and a sixth lens group having a positive refractive power disposed in this order from the magnification side, wherein the reduction side is configured to be telecentric;

the numerical aperture of the zoom lens is configured to be constant over the entire zoom range;

the amount of movement of the fourth lens group while changing magnification from the wide angle end to the telephoto end is the greatest among the amounts of movement of all of the lens groups; and the projection zoom lens satisfies conditional formulas (1) and (2) below when the absolute values of the amounts of movement of the second, third, fourth, and fifth lens groups while changing magnification from the wide angle end to the telephoto end are respectively m2, m3, m4, and m5, and the focal length of the entire system at the wide angle end is fw:

$$1.9 < m4/fw \qquad (1)$$

$$0.7 < (m3+m4)/(m2+m3+m4+m5) \qquad (2).$$

Here, the above expression "essentially consisting of . . . a sixth lens group" means that the projection zoom lens may include lenses substantially without any power; optical elements other than lenses such as a stop, a cover glass, and the like; and mechanical components such as lens flanges, lens barrels, imaging sensors and image stabilization mechanisms, in addition to the lens groups which are listed therein. The same applies to a second projection zoom lens of the present invention to be described later.

The above expression "reduction side is telecentric" refers to a state in which a line bisecting the angle formed by a ray having a maximum height in the upper side and a ray having a maximum height in the bottom side is nearly parallel to the optical axis in a cross section of a light beam which is focused on an arbitrary point on an image surface at the reduction side. The above expression is not limited to a case that the reduction side is completely telecentric, that is, the line bisecting the angle is completely parallel to the optical axis, but also refers to cases in which a certain degree of error is present. Here, the certain degree of error refers to a range of inclination between the bisecting angular line and the optical axis of ±3°. This applies to the second projection zoom lens of the present invention to be described later, as well.

A second projection zoom lens according to the present invention essentially consisting of a first lens group having a negative refractive power, a second lens group having a positive refractive power that moves along the optical axis while changing magnification, a third lens group having a positive refractive power that moves along the optical axis while changing magnification, a fourth lens group having a positive refractive power that moves along the optical axis while changing magnification, a fifth lens group that moves along the optical axis while changing magnification, and a sixth lens group having a positive refractive power disposed in this order from the magnification side, wherein the fifth lens group has a negative refractive power;

the reduction side is configured to be telecentric;

the numerical aperture of the zoom lens is configured to be constant over the entire zoom range;

the amount of movement of the fourth lens group while changing magnification from the wide angle end to the telephoto end is the greatest among the amounts of movement of all of the lens groups; and the projection zoom lens satisfies conditional formula (1) below when the absolute value of the amount of movement of the fourth lens group while changing magnification from the wide angle end to the telephoto end is m4 and the focal length of the entire system at the wide angle end is fw:

$$1.9 < m4/fw \qquad (1).$$

Note that it is desirable for this second projection zoom lens to satisfy conditional formula (2) when the absolute values of the amounts of movement of the second, third, fourth, and fifth lens groups while changing magnification from the wide angle end to the telephoto end to be respectively m2, m3, m4, and m5:

$$0.7 < (m3+m4)/(m2+m3+m4+m5) \qquad (2).$$

In the first and second projection zoom lenses according to the present invention, it is desirable for an aperture stop to be positioned at the reduction side of the third lens group and at the magnification side of the fifth lens group. In addition, it is desirable for conditional formula (3) below to be satisfied when the focal length of the fourth lens group is f4 and the focal length of the entire system at the wide angle end is fw:

$$3.0 < f4/fw < 5.5 \qquad (3).$$

Here, it is more desirable for the condition defined by conditional formula (3) above to satisfy conditional formula (3') below:

$$3.5 < f4/fw < 5.0 \qquad (3').$$

Further, it is desirable for the aperture stop positioned at the reduction side of the third lens group and at the magnification side of the fifth lens group as described above to be a variable stop which varies the aperture diameter thereof while changing magnification.

In addition, it is desirable for the aperture stop positioned at the reduction side of the third lens group and at the magnification side of the fifth lens group as described above to move along the optical axis independently from the other lenses while changing magnification.

Further, in the case that the first or second projection zoom lens according to the present invention, particularly in which the aperture stop is positioned at the reduction side of the third lens group and at the magnification side of the fifth lens group as described above, satisfies conditional formula (3), it is desirable for lens groups of the third lens group through the fifth lens group to move toward the magnification side monotonically while changing magnification from the wide angle end to the telephoto end.

Further, in the case that the first or second projection zoom lens according to the present invention, particularly in which the aperture stop is positioned at the reduction side of the third lens group and at the magnification side of the fifth lens group as described above, satisfies conditional formula (3), it is desirable for conditional formulas (4) and (5) below to be satisfied when the back focus (air converted length) of the entire system at the reduction side at the wide angle end is Bf, the maximum effective image circle diameter (image circle diameter) at the reduction side is Imφ, and the distance between the most-magnification-side lens surface and the most-reduction-side lens surface along the optical axis when the projection distance is infinite is L:

$$2.5 < Bf/Im\phi \qquad (4)$$

$$L/Im\phi < 12 \qquad (5).$$

Here, it is more desirable for the condition defined by conditional formula (5) above to satisfy conditional formula (5') below:

$$8 < L/Im\phi < 11 \qquad (5').$$

Further, in the case that the first or second projection zoom lens according to the present invention, particularly in which the aperture stop is positioned at the reduction side of the third lens group and at the magnification side of the fifth lens group as described above, satisfies conditional formula (3), it is desirable for the second lens group to include a lens having a negative refractive power.

Further, in the case that the first or second projection zoom lens according to the present invention, particularly in which the aperture stop is positioned at the reduction side of the third lens group and at the magnification side of the fifth lens group as described above, satisfies conditional formula (3), it is desirable for the third lens group to include a lens having a negative refractive power.

Further, in the case that the first or second projection zoom lens according to the present invention, particularly in which the aperture stop is positioned at the reduction side of the third lens group and at the magnification side of the fifth lens group as described above, satisfies conditional formula (3), it is desirable for the fourth lens group to include a lens having a positive refractive power. In addition, it is also desirable for conditional formula (6) below to be satisfied when the Abbe number of the medium of this lens having a positive refractive power is νp:

$$60 < \nu p \qquad (6).$$

Here, it is more desirable for the condition defined by conditional formula (6) above to satisfy conditional formula (6') below, and even more desirably conditional formula (6'') below:

$$70 < \nu p \qquad (6'),$$

and $$80 < \nu p \qquad (6'').$$

Further, in the case that the first or second projection zoom lens according to the present invention, particularly in which the aperture stop is positioned at the reduction side of the third lens group and at the magnification side of the fifth lens group as described above, satisfies conditional formula (3), it is desirable for the fifth lens group to include a lens having a negative refractive power, a lens having a positive refractive power, and a lens having a negative refractive power arranged in this order from the magnification side.

Note that the lenses which constitute each lens group may be cemented lenses in the projection zoom lenses of the present invention. A cemented lens, which is constituted by bonding n numbers of lenses together, will be counted as n lenses.

Further, the surface shapes of lenses and the signs of refractive powers thereof in the projection zoom lens of the present invention should be considered in the paraxial region with respect to lenses including aspheric surfaces.

The projection type display device according to the present invention includes a light source, a light valve into which light from the light source enters, and a projection zoom lens which projects an optical image formed by the light optically modulated by the light valve onto a screen. The first or second projection zoom lens according to the present invention described above is applied as such a projection zoom lens.

In the first projection zoom lens according to the present invention, the amount of movement of the fourth lens group while changing magnification from the wide angle end to the telephoto end is the greatest among the amounts of movement of all of the lens groups. Further, the amounts of movement of the fourth lens group and the third lens group adjacent thereto while changing magnification are great to a degree that satisfies conditional formulas (1) and (2):

$$1.9 < m4/fw \qquad (1)$$

$$0.7 < (m3+m4)/(m2+m3+m4+m5) \qquad (2).$$

Accordingly, the first projection zoom lens according to the present invention can secure a high zoom ratio.

In the second projection zoom lens according to the present invention, the amount of movement of the fourth lens group while changing magnification from the wide angle end to the telephoto end is the greatest among the amounts of movement of all of the lens groups. Further, the amount of movement of the fourth lens group while changing magnification is great to a degree that satisfies conditional formula (1):

$$1.9 < m4/fw \qquad (1).$$

Accordingly, the second projection zoom lens according to the present invention can secure a high zoom ratio.

Further, particularly in the case that the amounts of movement of the fourth lens group and the third lens group adjacent thereto while changing magnification are great to a degree that satisfies conditional formula (2) in the second projection zoom lens according to the present invention, a higher zoom ratio can be secured:

$$0.7 < (m3+m4)/(m2+m3+m4+m5) \qquad (2).$$

Based on the above, the first and second projection zoom lenses according to the present invention are configured in such a manner that the third lens group and the fourth lens group, particularly the fourth lens group mainly operates to change magnification, and the second lens group and the fifth lens group can mainly operate to correct aberrations accordingly. Therefore, aberrations can be corrected favorably even when the projection zoom lenses have a long back focus, and both a long back focus and a high zoom ratio thus can be achieved.

Further, particularly in the case that the first or second projection zoom lens according to the present invention satisfies conditional formula (3), spherical aberration can be reduced and miniaturization can be achieved:

$$3.0 < f4/fw < 5.5 \qquad (3).$$

In other words, when the value of f4/fw becomes less than or equal to 3.0, spherical aberration will increase. When the value of f4/fw becomes greater than or equal to 5.5, the lens diameter will increase, resulting in the zoom lens becoming likely to increase in size. However, conditional formula (3) is satisfied, such problems can be avoided so that spherical aberration can be reduced, and miniaturization can be achieved.

The advantageous effects described above will become more prominent when conditional formula (3') below is satisfied within the range defined by conditional formula (3):

$$3.5 < f4/fw < 5.0 \qquad (3').$$

Further, in the first or second projection zoom lens according to the present invention, the aperture stop is positioned at the reduction side than the third lens group and at the magnification side of the fifth lens group, satisfies conditional formula (3). Particularly in such a case, a space can be easily secured at the lens back for the prism and the like described above to be disposed therein and the zoom lens can be miniaturized when conditional formulas (4) and (5) described above are satisfied:

$$2.5<Bf/Im\phi \quad (4)$$

$$L/Im\phi<12 \quad (5).$$

More specifically, when the value of $Bf/Im\phi$ is less than or equal to 2.5, the back focus will become short and the space at the lens back will become small. In contrast, when the value of $Bf/Im\phi$ exceeds 2.5, such problems can be avoided so that a space can be easily secured at the lens back.

Further, when the value of $L/Im\phi$ is greater than or equal to 12, the total length of the lens will increase and the zoom lens will upsize. In contrast, when the value of $L/Im\phi$ falls below 12, such problems can be avoided so that the zoom lens can be miniaturized.

The advantageous effects described above will be more prominent in the case that conditional formula (5') below is satisfied within the range defined by conditional formula (5):

$$8<L/Im\phi<11 \quad (5').$$

Further, in such a case, chromatic aberration can be reduced as well. In other words, when the value of $L/Im\phi$ is less than or equal to 8, chromatic aberration will be likely to increase. However, when the value of $L/Im\phi$ exceeds 8, such a problem can be avoided so that chromatic aberration can be reduced.

Further, in the first or second projection zoom lens according to the present invention, the aperture stop is positioned at the reduction side of the third lens group and at the magnification side of the fifth lens group and conditional formula (3) is satisfied. Particularly in such a case, longitudinal chromatic aberration can be diminished when conditional formula (6) is satisfied:

$$60<\nu p \quad (6).$$

The advantageous effect described above will be more prominent in the case that conditional formula (6') below is satisfied within the range defined by conditional formula (6):

$$70<\nu p \quad (6').$$

Further, the advantageous effect described above will be even more prominent when conditional formula (6") below is satisfied:

$$80<\nu p \quad (6'').$$

Note that there is generally demand for zoom lenses which are applied to projection type display devices utilized in movie theaters, and the like to have F numbers of less than 3.0 (which is bright) over the entire zoom range. The projection zoom lenses of the present invention are capable of fulfilling such a demand. Specific numerical values thereof will be described later with reference to Examples.

Further, there is generally demand for the projection type display devices as described above to suppress distortion to within approximately 2% over the entire zoom range. The projection zoom lenses of the present invention are capable of fulfilling such a demand. Specific numerical values thereof will be described later with reference to the Examples.

The projection type display device of the present invention employs the zoom lenses of the present invention as described above as a projection zoom lens. Accordingly, a high zoom ratio can be secured and a constant numerical aperture can be maintained over the entire zoom range in the projection type display device of the present invention.

BRIEF DESCRIPTION OF THE DRAWINGS

FIG. 5 is a collection of cross-sectional views of a projection zoom lens according to Example 5 of the present invention, illustrating the lens configuration thereof.

FIG. 12 shows aberration diagrams A through L of the projection zoom lens according to the above Example 2.

FIG. 14 shows aberration diagrams A through L of the projection zoom lens according to the above Example 4.

FIG. 17 shows aberration diagrams A through L of the projection zoom lens according to the above Example 7.

FIG. 18 shows aberration diagrams A through L of the projection zoom lens according to the above Example 8.

FIG. 19 shows aberration diagrams A through L of the projection zoom lens according to the above Example 9.

FIG. 20 shows aberration diagrams A through L of the projection zoom lens according to the above Example 10.

DESCRIPTION OF THE PREFERRED EMBODIMENTS

Figure 1:
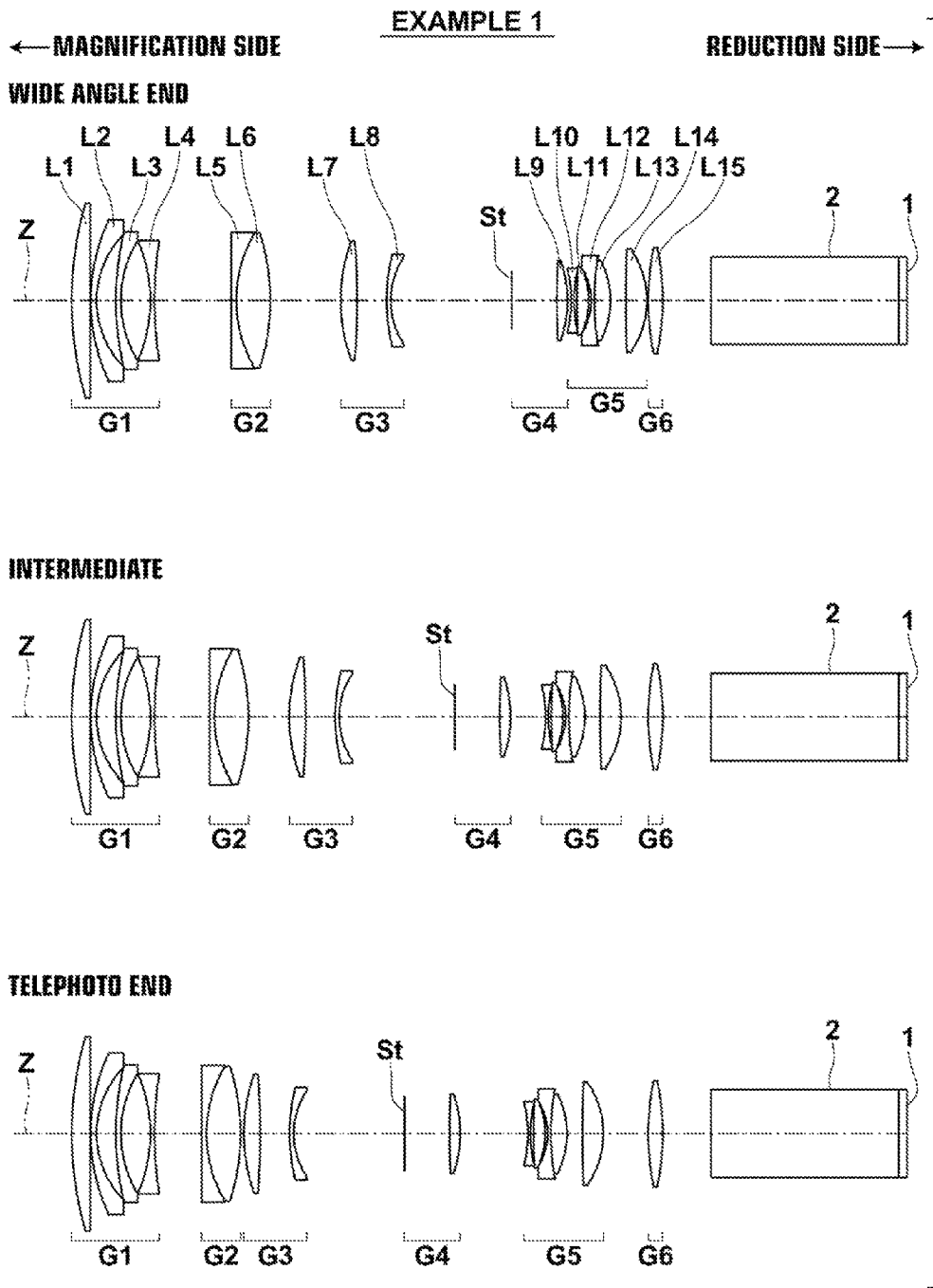
FIG. 1 is a collection of cross-sectional views of a projection zoom lens according to Example 1 of the present invention, illustrating the lens configuration thereof.

Hereinafter, embodiments of the present invention will be described in detail with reference to the accompanying drawings. First, a projection zoom lens according to one embodiment of the present invention will be described with reference to FIG. 1. FIG. 1 illustrates moving positions of the lens groups at the wide angle end, the telephoto end, and the intermediate position therebetween when the projection zoom lens according to Example 1 of the present invention is operated to change magnification. The manner, in which the configuration is shown, is the same as those in FIGS. 1 through 10.

FIGS. 2 through 10 are cross-sectional views illustrating examples of other configurations according to the embodiments of the present invention, corresponding to projection zoom lenses according to Examples 2 through 10 to be described later.

The embodiments of the present invention will be described below mainly with reference to the configuration illustrated in FIG. 1 as an example. The projection zoom lens of the present embodiment can be loaded on projection type display devices utilized in movie theaters, and the like to produce digital images. For example, the projection zoom lens of the present embodiments can be used as a projection lens which projects image information displayed on a light valve onto a screen. In FIG. 1, the left side is designated as the magnification side and the right side is designated as the reduction side. Further, supposing a case that the projection zoom lens is mounted on the projection type display devices, FIG. 1 also shows glass blocks 2, 1, such as a color combining prism (which includes a filter and the like). This applies to FIGS. 2 through 10 below in the same manner as FIG. 1. Note that an image display surface of the light valve is configured to lie on the reduction-side surface of the glass block 1, for example.

In the projection type display device, a light beam, which has been provided with image information at the image display surface above, enters the projection zoom lens via the glass blocks 2, 1. Then, the projection zoom lens enlarges and projects images onto a screen (not shown) disposed toward the leftward direction in the Figure.

According to the description above, FIG. 1 shows an example in which the position of the reduction-side surface of the glass block 2 matches the position of the image display surface. The projection zoom lens of the present invention, however, is not necessarily limited to such a configuration. Further, according to the description above, only one image display surface is provided with the projection type display device. However, the projection type display device may be configured to have a color separation optical system to separate the light beam from the light source into the three primary colors and to include three light valves which respectively correspond to the three primary colors so that full color images can be displayed.

The projection zoom lens according to the present embodiment essentially consists of a first lens group G1 having a negative refractive power, a second lens group G2 having a positive refractive power, a third lens group G3 having a positive refractive power, a fourth lens group G4 having a positive refractive power, a fifth lens group G5 having a negative refractive power, and a sixth lens group G6 having a positive refractive power as substantial lens groups. The first lens group G1 is disposed at the most-magnification side and fixed while changing magnification. The second lens group G2 is disposed next to the first lens group G1 at the reduction side and caused to move while changing magnification. The third lens group G3 is disposed next to the second lens group G2 at the reduction side and caused to move while changing magnification. The fourth lens group G4 is disposed next to the third lens group G3 at the reduction side and caused to move while changing magnification. The fifth lens group G5 is disposed next to the fourth lens group G4 at the reduction side and caused to move while changing magnification. The sixth lens group G6 is disposed at the most-reduction side and fixed while changing magnification. Further, the projection zoom lens according to the present embodiment is configured to be telecentric at the reduction side. The configurations of the lens groups described above are the same as those of the projection zoom lenses of FIGS. 1 through 6, and 9.

Further, such a projection zoom lens is configured to move the first lens group G1 to perform focusing.

As shown in an example of FIG. 1, the first lens group G1 essentially consists of four lenses (the first lens L1 through the fourth lens L4), and the second lens group G2 essentially consists of two lenses (the fifth lens L5 through the sixth lens L6). Further, the third lens group G3 essentially consists of two lenses (the seventh lens L7 and the eighth lens L8), and the fourth lens group G4 essentially consists of one lens (the ninth lens L9) and the aperture stop St positioned at the magnification side of the lens L9. Further, the fifth lens group G5 essentially consists of five lenses (the tenth lens L10 through the fourteenth lens L14), and the sixth lens group G6 essentially consists of one lens (the fifteenth lens L15).

However, the number of lenses that constitute each lens group of the projection zoom lens is not necessarily limited to the example of FIG. 1. For example, in the projection zoom lens of Example 3 to be described later, the second lens group G2 consists of one lens and the fourth lens group G4 consists of two lenses. Further, in the projection zoom lens of Example 4 to be described later, the sixth lens group G6 consists of two lenses.

In the projection zoom lens of the present embodiment, the aperture stop St disposed in the fourth lens group G4 is a variable stop that varies the aperture diameter in such a manner that the numerical aperture of the zoom lens is constant over the entire zoom range. This applies to Examples 2 through 9 in the same manner as in Example 1 irrespective of differences in the positions of arrangement of the aperture stop St. However, an aperture stop, the aperture diameter of which does not vary, may be utilized in the projection zoom lenses of the present invention, as in Example 10.

Further, in the projection zoom lens of the present embodiment, the amount of movement of the fourth lens group g4 while changing magnification from the wide angle end to the telephoto end is the greatest among the amounts of movement of all of the lens groups. In addition, the projection zoom lens satisfies conditional formulas (1) and (2) below when the absolute values of the amounts of movement of the second lens group G2, the third lens group G3, the fourth lens group G4, and the fifth lens group G5 while changing magnification from the wide angle end to the telephoto end are respectively m2, m3, m4, and m5; and the focal length of the entire system at the wide angle end is fw:

$$1.9 < m4/fw \qquad (1)$$

$$0.7 < (m3+m4)/(m2+m3+m4+m5) \qquad (2).$$

Accordingly, the projection zoom lens of the present embodiment is capable of securing a high zoom ratio.

Note that Table 22 shows a collection of the values of the conditions (i.e., the equations) defined by conditional formulas (1) and (2) above and the other conditional formulas (3) through (6) for each Example. In addition, Table 23 shows a collection of the values of the conditions related to conditional formulas (1) through (6) and the other principal conditions for each Example.

Further, in the projection zoom lens of the present embodiment, the aperture stop St is positioned at the reduction side of the third lens group G3 and at the magnification side of the fifth lens group G5. Further, the projection zoom lens satisfies conditional formula (3) below when the focal length of the fourth lens group G4 is f4 and the focal length of the entire system at the wide angle end is fw:

$$3.0 < f4/fw < 5.5 \qquad (3).$$

Accordingly, in the projection zoom lens of the present embodiment, spherical aberration can be reduced and the lens system can be miniaturized. The detailed reason therefor has already been given.

The advantageous effects above will become more prominent because conditional formula (3') above is satisfied as well within the range defined by conditional formula (3) in the present embodiment.

Further, the projection zoom lens of the present embodiment satisfies conditional formulas (4) and (5) below when the back focus (air converted length) at the reduction side of the entire system at the wide angle end is Bf, the maximum effective image circle diameter (image circle diameter) at the reduction side is Imp, and the distance between the most-magnification-side lens surface (the magnification-side lens surface of the first lens L1) and the most-reduction-side lens surface (the reduction-side lens surface of the fifteenth lens L15) along the optical axis when the projection distance is infinite is L:

$$2.5 < Bf/Im\phi \qquad (4)$$

$$L/Im\phi < 12 \qquad (5).$$

Accordingly, in the projection zoom lens of the present embodiment, a space can be easily secured at the lens back for the prism and the like described above to be disposed therein and the zoom lens can be miniaturized. The detailed reason therefor has already been given.

The advantageous effects above will be more prominent because conditional formula (5') above is satisfied as well within the range defined by conditional formula (5) in the projection zoom lens of the present embodiment. In such a case, chromatic aberration can be suppressed as well. The detailed reason therefor has already been given.

Further, in the projection zoom lens of the present embodiment, the fourth lens group G4 includes a lens (the ninth lens L9) having a positive refractive power. In addition, the projection zoom lens satisfies conditional formula (6) below when the Abbe number of the medium of the ninth lens L9 is $vp$:

$$60 < vp \qquad (6).$$

Table 1 to be described later will show the Abbe number of each lens.

Accordingly, longitudinal chromatic aberration can be reduced in the projection zoom lens of the present embodiment. Further, the advantageous effects described above will become much more prominent because conditional formulas (6') and (6") above are satisfied within the range defined by conditional formula (6) in the present embodiment.

Figure 7:
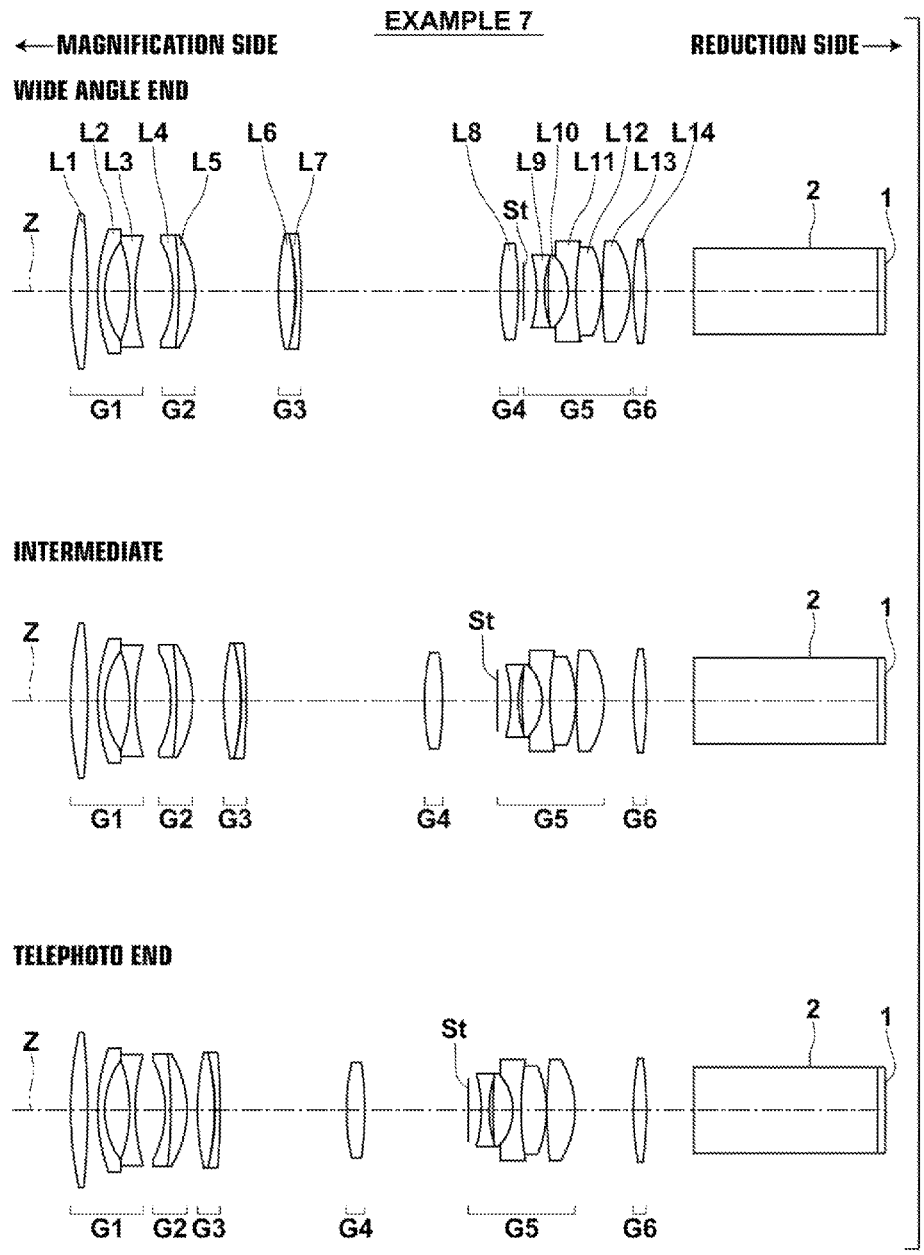
FIG. 7 is a collection of cross-sectional views of a projection zoom lens according to Example 7 of the present invention, illustrating the lens configuration thereof.

Next, another embodiment, in which configurations of the lens groups are different from those described above, will be described. A projection zoom lens of the embodiment, a collection of cross sectional views of which are illustrated in FIG. 7, correspond to a projection zoom lens of Example 7 to be described later. The projection zoom lens according to the present embodiment consists of a first lens group G1 having a negative refractive power, a second lens group G2 having a positive refractive power, a third lens group G3 having a positive refractive power, a fourth lens group G4 having a positive refractive power, a fifth lens group G5 having a positive refractive power, and a sixth lens group G6 having a positive refractive power as substantial lens groups. The first lens group G1 is disposed at the most-magnification side and fixed while changing magnification, and the second lens group G2 is disposed next to the first lens group G1 at the reduction side and caused to move while changing magnification. The third lens group G3 is disposed next to the second lens group G2 at the reduction side and caused to move while changing magnification, and the fourth lens group G4 is disposed next to the third lens group G3 at the reduction side and caused to move while changing magnification. The fifth lens group G5 is disposed next to the fourth lens group G4 at the reduction side and caused to move while changing magnification, and the sixth lens group G6 is disposed at the most-reduction side and fixed while changing magnification. Further, the projection zoom lens is configured to be telecentric at the reduction side. The configurations of the lens groups described above are the same as those of Examples 7, 8, and 10.

The configuration described above basically differs from that of the projection zoom lens in FIG. 1 described above in that the fifth lens group G5 has a positive refractive power in the present embodiment.

As shown in an example of FIG. 7, the first lens group G1 essentially consists of three lenses (the first lens L1 through the third lens L3), and the second lens group G2 essentially consists of two lenses (the fourth lens L4 through the fifth lens L5). Further, the third lens group G3 essentially consists of two lenses (the sixth lens L6 and the seventh lens L7), and the fourth lens group G4 essentially consists of one lens (the eighth lens L8). Further, the fifth lens group G5 essentially consists of five lenses (the ninth lens L9 through the thirteenth lens L13) and the aperture stop St positioned at the magnification side of the lens L9. Further, the sixth lens group G6 essentially consists of one lens (the fourteenth lens L14). The number of lenses that constitutes each lens group is not necessarily limited to that of the example shown in FIG. 7.

The projection zoom lens of the embodiment in FIG. 7 satisfies all of conditional formulas (1) through (6) above and conditional formulas (3'), (5'), (6'), and (6") as well. The advantageous effects obtained thereby are the same as those described above.

Figure 21:
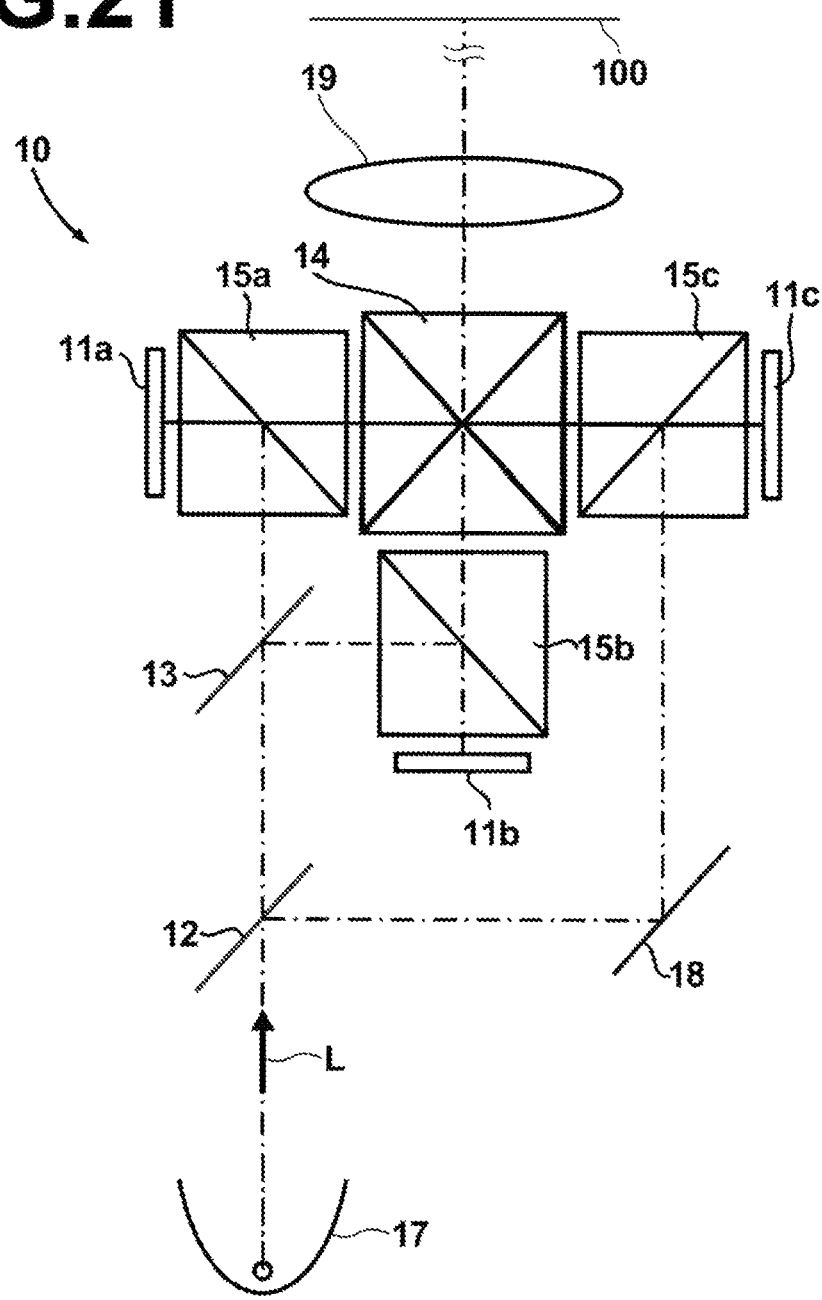
FIG. 21 is a schematic configuration diagram of a projection type display device according to an embodiment of the present invention.

Next, the embodiment of the projection type display device according to the present invention will be described with reference to FIGS. 21 and 22. FIG. 21 is a schematic configuration diagram of a part of a projection type display device according to one embodiment of the present invention. The projection type display device illustrated in FIG. 21 includes an illumination optical system 10. The illumination optical system 10 includes reflection type display elements 11a through 11c as light valves respectively corresponding to the colored light beams, dichroic mirrors 12, 13 for color separation, a cross dichroic prism 14 for combining colors, a total reflection mirror 18 for deflecting optical paths, and polarized light separation prisms 15a through 15c. Note that a light source 17 which emits a white light beam L is disposed in the front of the dichroic mirror 12.

A white light beam L emitted from the light source 17 is separated into three colored light (G light, B light, and R light) by the dichroic mirrors 12, 13. The separated colored light beams respectively enter the reflection type display elements 11a through 11c corresponding thereto to be optically modulated, via the polarized light separation prisms 15a through 15c. The optically modulated light beams are subjected to the color composition by the cross dichroic prism 14, and then enters the projection zoom lens 19 according to the embodiment of the present invention. Then, optical images formed by the entered light are projected onto a screen 100 by the projection zoom lens 19.

Figure 22:
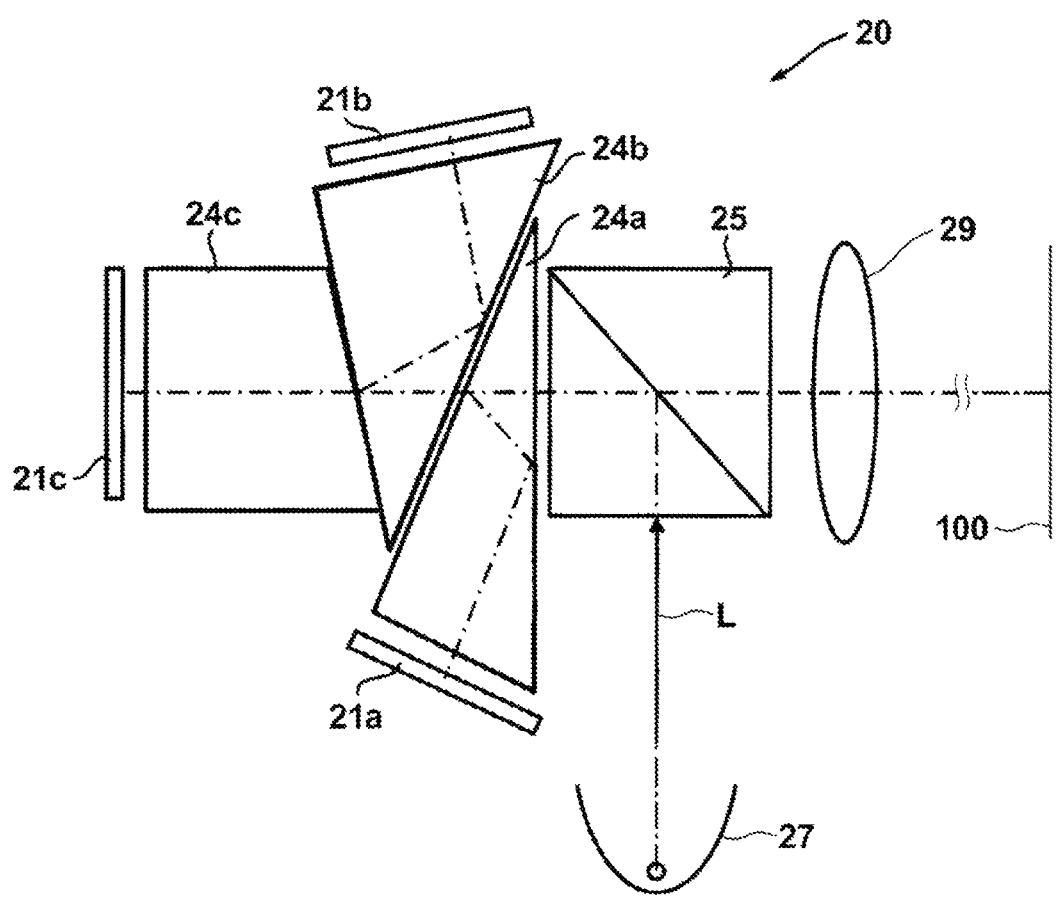
FIG. 22 is a schematic configuration diagram of a projection type display device according to another embodiment of the present invention.

Next, FIG. 22 is a schematic configuration diagram of a part of a projection type display device according to another embodiment of the present invention. The projection type display device illustrated in FIG. 22 includes an illumination optical system 20. The illumination optical system 20 includes reflection type display elements 21a through 21c as light valves respectively corresponding to the colored light beams, TIR (Total Internal Reflection) prisms 24a through 24c for a color separation and color composition, and a polarized light separation prism 25. Note that a light source 27 which emits a white light beam L is disposed in the front of the polarized light separation prism 25.

A white light beam L emitted from the light source 27 passes through the polarized light separation prism 25, and then is separated into three colored light (G light, B light, and R light) by the TIR prisms 24a through 24c. The separated colored light beams respectively enter the reflection type display elements 21a through 21c corresponding thereto to be optically modulated. The optically modulated light beams travel again through the TIR prism 24a through 24c in the opposite direction to be combined, and then penetrate the polarized light separation prism 25 to enter the projection zoom lens 29 according to the embodiment of the present invention. Then, optical images formed by the entered light are projected onto a screen 100 by the projection zoom lens 29.

Note that the reflection type display elements 11a through 11c and 21a through 21c may be reflection type liquid crystal display elements, DMD's, or the like, for example. Although FIGS. 21 and 22 show examples in which the reflection type display elements are utilized as light valves, the light valves included in the projection type display device of the present invention are not limited to these elements, and transmissive display elements such as transmissive type liquid crystal display elements and the like may be employed.

Next, specific Examples of the projection zoom lens of the present invention will be described. Note that all of Examples 1 through 10 to be described below correspond to Examples of the first projection zoom lens of the present invention. Particularly Examples 1 through 6 among these Examples also correspond to the Examples of the second projection zoom lens of the present invention.

Example 1

FIG. 1 illustrates the arrangement of the lens groups of the projection zoom lens of Example 1 at each of the wide angle end, the telephoto end, and the intermediate position therebetween. Note that since the detailed descriptions of FIG. 1 has already been given, redundant descriptions will be omitted unless particularly necessary.

The projection zoom lens of this Example 1 consists of a first lens group G1 having a negative refractive power, a second lens group G2 having a positive refractive power, a third lens group G3 having a positive refractive power, a fourth lens group G4 having a positive refractive power, a fifth lens group G5 having a negative refractive power, and a sixth lens group G6 having a positive refractive power as substantial lens groups. The first lens group G1 is disposed at the most-magnification side and fixed while changing magnification, and the second lens group G2 is disposed next to the first lens group G1 at the reduction side and caused to move while changing magnification. The third lens group G3 is disposed next to the second lens group G2 at the reduction side and caused to move while changing magnification, and the fourth lens group G4 is disposed next to the third lens group G3 at the reduction side and caused to move while changing magnification. The fifth lens group G5 is disposed next to the fourth lens group G4 at the reduction side and caused to move while changing magnification, and the sixth lens group G6 is disposed at the most-reduction side and fixed while changing magnification. Further, the projection zoom lens is configured to be telecentric at the reduction side. As described above, the configurations of the lens groups described above are the same as those of Examples 1 through 6, and 9.

The first lens group G1 consists of four lenses: a first lens L1 having a positive refractive power (hereinafter, a lens having a positive or negative refractive power will be simply referred to as a "positive" or "negative" lens), a negative second lens L2, a negative third lens L3, and a negative fourth lens L4 disposed in this order from the magnification side. Further, the second lens group G2 consists of two lenses: a negative fifth lens L5 and a positive sixth lens L6 disposed in this order from the magnification side.

The third lens group G3 consists of two lenses: a positive seventh lens L7 and a negative eighth lens L8 disposed in this order from the magnification side. The fourth lens group G4 consists of an aperture stop St which is a variable stop and a positive ninth lens L9.

The fifth lens group G5 consists of five lenses: a negative tenth lens L10, a positive eleventh lens L11, a negative twelfth lens L12, a positive thirteenth lens L13, and a positive fourteenth lens L14 disposed in this order from the magnification side. The sixth lens group G6 consists of one lens, a positive fifteenth lens L15. Note that the twelfth lens L12 and the thirteenth lens L13 are cemented to each other.

Table 1 shows basic lens data of the projection zoom lens of Example 1. The glass blocks 2, 1 are also shown therein. In Table 1, i-th (i=1, 2, 3, . . . ) surface numbers, the value of i sequentially increasing from the surface of the constituent element at the most-magnification side, which is designated as 1, toward the reduction side, are shown in the column Si. The radii of curvature of i-th surfaces are shown in the column Ri, and distances between i-th surfaces and (i+1)th surfaces along the optical axis Z1 are shown in the column Di. Further, the refractive indices of j-th (j=1, 2, 3, . . . ) constituent elements with respect to the d-line (wavelength: 587.6 nm), the value of j sequentially increasing from the constituent element at the most magnification side, which is designated as 1, toward the reduction side, are shown in the column Ndj. The Abbe numbers of j-th constituent elements with respect to the d-line are shown in the column vdj.

Note that the values of the radius of curvature R and the distance between surfaces D shown in Table 1 are normalized such that the focal length of the entire system of the projection zoom lens at the wide angle end becomes 10.00. The numerical values in Table 1 are rounded to a predetermined number of digits. The sign of the radius of curvature is positive in the case that a surface shape is convex on the magnification side, and negative in the case that the surface shape is convex on the reduction side.

Among the distances between surfaces D, the distance between the first lens group G1 and the second lens group G2, the distance between the second lens group G2 and the third lens group G3, the distance between the third lens group G3 and the fourth lens group G4, the distance between the fourth lens group G4 and the fifth lens group G5, and the distance between the fifth lens group G5 and the sixth lens group G6 are variable distances that vary while changing magnification. DD 8, DD 11, DD 15, DD 18, and DD 27, which are respectively represented by indicating "DD" with the surface number of the frontward surface from which the distance is measured, are respectively shown in the spaces of the distance between surfaces corresponding to these distances.

The same as described above applies to Tables 3, 5, 8, 10, 12, 14, 16, 18, and 20 to be described later. Regarding the distances between variable lens groups as listed above, the numbers that follow "DD" change according to the number of the constituent elements in each of the Examples. However, each of the distances between the variable lens groups is represented by indicating the surface number of the frontward surface from which the distance is measured in the same manner in all of the Tables. In addition, the mark "*" is indicated at surface numbers of aspherical surfaces.

Table 2 shows the values of the focal length f of the entire system, back focus Bf, the variable distances DD8, DD11, DD15, DD18, and DD27, and the stop diameter of the aperture stop St (which refers to the aperture diameter: the diameter) at each of the wide angle end, an intermediate position, and the telephoto end while changing magnification in the project zoom lens of Example 1. These numerical values are also normalized such that the focal length of the entire system at the wide angle end is 10.00. In addition, these numerical values are for when the projection distance is infinity. Table 2 also shows the zoom ratios (a zoom ratio is 1.00 at the wide angle end), the F numbers (numerical aperture) Fno., and the full angle of view 2 ω (the unit is a degree) of the zoom lens of Example 1.

The manner, in which Table 2 is shown as described above, is the same as those of Tables 4, 6, 9, 11, 13, 15, 17, 19, and 21.

As shown in Table 2, a high zoom ratio, e.g., 1.43, is secured in the present Example. Further, in all of Examples 1 through 10, the high zoom ratios, e.g., 1.43 through 1.67, are obtained. The values of the F numbers are maintained at a constant value of 2.5, which is sufficiently smaller than 3.0 described above, at all of the wide angle end, the intermediate position, and the telephoto end. The same applies to Examples 2 through 10.

TABLE 1

Example 1: Basic Lens Data

| Si Surface Number | Ri Radius of Curvature | Di Distance Between Surfaces | Ndj Refractive Index | vdj Abbe Number |
|---|---|---|---|---|
| 1 | 71.9343 | 3.715 | 1.62299 | 58.16 |
| 2 | ∞ | 0.107 | | |
| 3 | 39.2386 | 1.148 | 1.61800 | 63.33 |
| 4 | 19.4267 | 3.886 | | |
| 5 | 61.3212 | 0.966 | 1.71299 | 53.87 |
| 6 | 23.6763 | 5.903 | | |
| 7 | −30.5448 | 0.858 | 1.61800 | 63.33 |
| 8 | 81.9992 | DD[8] | | |
| 9 | ∞ | 0.971 | 1.84661 | 23.78 |
| 10 | 27.2828 | 6.802 | 1.72047 | 34.71 |
| 11 | −44.9101 | DD[11] | | |
| 12 | 35.6924 | 3.256 | 1.67270 | 32.10 |
| 13 | −164.3529 | 5.921 | | |
| 14 | 39.5138 | 0.805 | 1.49700 | 81.54 |
| 15 | 16.1272 | DD[15] | | |
| 16(Aperture Stop) | ∞ | 8.985 | | |
| 17 | 132.4478 | 2.145 | 1.49700 | 81.54 |
| 18 | −25.7826 | DD[18] | | |
| 19 | −27.4801 | 0.536 | 1.61772 | 49.81 |
| 20 | 27.4801 | 0.579 | | |
| 21 | 103.8717 | 2.379 | 1.48749 | 70.23 |
| 22 | −16.3936 | 0.473 | | |
| 23 | −12.5784 | 0.649 | 1.77250 | 49.60 |

TABLE 1-continued

Example 1: Basic Lens Data

| Si Surface Number | Ri Radius of Curvature | Di Distance Between Surfaces | Ndj Refractive Index | vdj Abbe Number |
|---|---|---|---|---|
| 24 | 52.1011 | 3.203 | 1.49700 | 81.54 |
| 25 | −18.1370 | 3.093 | | |
| 26 | 252.4568 | 4.204 | 1.49700 | 81.54 |
| 27 | −18.6515 | DD[27] | | |
| 28 | 52.7115 | 2.898 | 1.49700 | 81.54 |
| 29 | −52.7115 | 9.661 | | |
| 30 | ∞ | 37.550 | 1.51633 | 64.14 |
| 31 | ∞ | 1.609 | 1.50847 | 61.19 |
| 32 | ∞ | | | |

TABLE 2

Example 1: Data Regarding Zooming

| | Wide Angle End | Intermediate Position | Telephoto End |
|---|---|---|---|
| Zoom Ratio | 1.00 | 1.20 | 1.43 |
| f | 10.00 | 11.96 | 14.30 |
| Bf | 35.49 | 35.49 | 35.49 |
| FNo. | 2.50 | 2.50 | 2.50 |
| 2ω[°] | 62.8 | 54.2 | 46.2 |
| DD[8] | 15.342 | 10.968 | 9.388 |
| DD[11] | 14.078 | 8.183 | 0.654 |
| DD[15] | 24.171 | 23.075 | 22.125 |
| DD[18] | 0.776 | 7.024 | 13.512 |
| DD[27] | 0.269 | 5.386 | 8.956 |
| Stop Diameter | 10.858 | 12.28 | 13.678 |

Here, Table 22 shows the values of the conditions (i.e., the equations) defined by conditional formulas (1) through (6) for each of Examples 1 through 10. As shown therein, conditional formulas (1) through (6) are satisfied in all of Examples 1 through 10. Further, conditional formulas (3'), (5'), (6'), and (6") above are satisfied as well in all of Examples 1 through 10.

Further, Table 23 shows the values of the conditions included in conditional formulas (1) through (6) and the other main conditions for each of Examples 1 through 10. Note that ft refers to the focal length of the entire system at the telephoto end, and f1, f2, f3, f5, and fe respectively refer to the focal lengths of a first lens group G1, a second lens group G2, a third lens group G3, a fifth lens group G5, and a final lens group (a sixth lens group G6) in Table 23.

Figure 11:
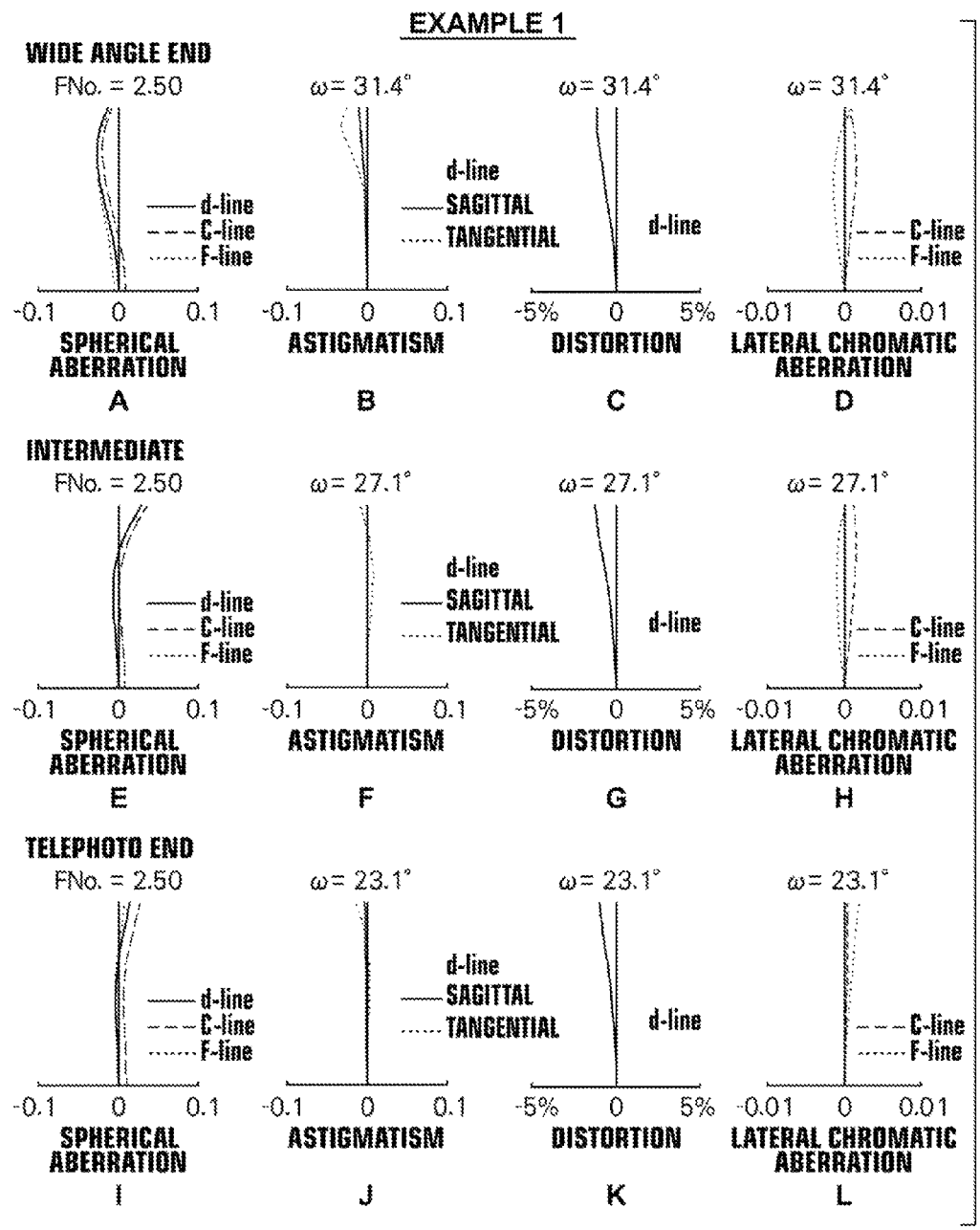
FIG. 11 shows aberration diagrams A through L of the projection zoom lens according to the above Example 1.

A through D of FIG. 11 respectively show aberration diagrams of spherical aberration, astigmatism, distortion, and lateral chromatic aberration of the projection zoom lens according to Example 1, at the wide angle end. E through H of FIG. 11 respectively show aberration diagrams of spherical aberration, astigmatism, distortion, and lateral chromatic aberration of the projection zoom lens according to Example 1, at the intermediate position. I through L of FIG. 11 respectively show aberration diagrams of spherical aberration, astigmatism, distortion, and lateral chromatic aberration of the projection zoom lens according to Example 1, at the telephoto end. As shown in FIG. 11, distortion is suppressed to within approximately 2% over the entire zoom range in Example 1. The same substantially applies to the other Examples 2 through 10.

Each of the aberration diagrams of A through L of FIG. 11 applies the d-line as a reference. However, the spherical aberration diagram shows aberrations with respect to the C-line (wavelength: 656.3 nm) and the F-line (wavelength: 486.1 nm) as well, and the lateral chromatic aberration diagram also shows aberrations with respect to the C-line and the F-line. Further, the astigmatism diagram shows aberration in a sagittal direction with a solid line and aberration in a tangential direction with a broken line. The sign "FNo.", which is indicated above the vertical axis in the spherical aberration diagram, refers to the F number, and the sign "ω", which is indicated above the vertical axis in the other aberration diagrams, refers to a half angle of view. Note that these values are for when the projection distance is infinity.

The arrangement diagrams of lens groups, the symbols in the Tables and the aberration diagrams, the meanings thereof, and the manners in which they are shown for Example 1 described above are basically the same for Examples 2 through 10 below, unless otherwise noted. The points that the arrangement diagrams (FIG. 1) of the lens groups of Example 1 described above are at the wide angle end, at the intermediate position, and at the telephoto end, and that the aberration diagrams are at the wide angle end, the intermediate position, and the telephoto end also similarly apply to Examples 2 through 10.

Example 2

Figure 2:
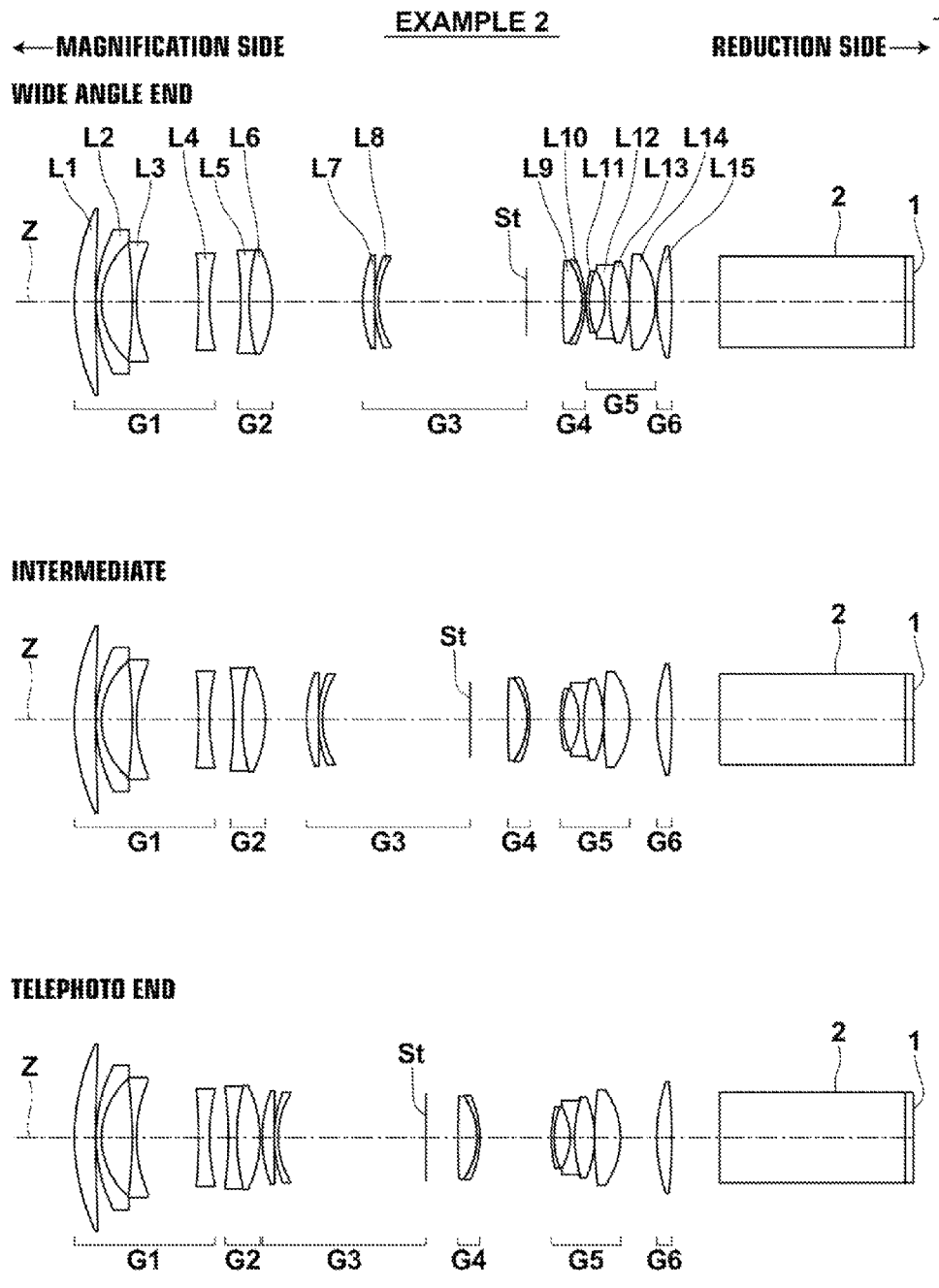
FIG. 2 is a collection of cross-sectional views of a projection zoom lens according to Example 2 of the present invention, illustrating the lens configuration thereof.

FIG. 2 shows a collection of the arrangement of the lens groups in the projection zoom lens of Example 2 at the wide angle end, the telephoto end, and the intermediate position therebetween. In Example 2, the first lens group G1 consists of four lenses: a positive first lens L1, a negative second lens L2, a negative third lens L3, and a negative fourth lens L4 disposed in this order from the magnification side. Further, the second lens group G2 consists of two lenses: a negative fifth lens L5 and a positive sixth lens L6 disposed in this order from the magnification side.

The third lens group G3 consists of two lenses, a positive seventh lens L7 and a negative eighth lens L8, and an aperture stop St which is a variable stop in this order from the magnification side. The fourth lens group G4 consists of two lenses, a positive ninth lens L9 and a negative tenth lens L10 disposed in this order from the magnification side.

The fifth lens group G5 consists of four lenses: a negative eleventh lens L11, a negative twelfth lens L12, a positive thirteenth lens L13, and a positive fourteenth lens L14 disposed in this order from the magnification side. The sixth lens group G6 consists of one lens, a positive fifteenth lens L15.

Note that the fifth lens L5 and the sixth lens L6 are cemented to each other, and the twelfth lens L12 and the thirteenth lens L13 are cemented to each other as well.

Table 3 shows the basic lens data of the projection zoom lens of Example 2. Further, Table 4 shows the specs of the projection zoom lens of Example 2 at each of the wide angle end, the intermediate position, and the telephoto end while changing magnification in the same manner as in Table 2. The display items and the manner in which the Table is shown are the same as described above.

TABLE 3

Example 2: Basic Lens Data

| Si Surface Number | Ri Radius of Curvature | Di Distance Between Surfaces | Ndj Refractive Index | νdj Abbe Number |
|---|---|---|---|---|
| 1 | 45.7579 | 4.344 | 1.62299 | 58.16 |
| 2 | 467.3392 | 0.053 | | |
| 3 | 33.1150 | 1.076 | 1.61800 | 63.33 |
| 4 | 16.2843 | 6.223 | | |
| 5 | −96.8726 | 0.861 | 1.80000 | 29.84 |
| 6 | 29.3536 | 12.664 | | |
| 7 | −94.9873 | 2.153 | 1.61800 | 63.33 |
| 8 | 44.2696 | DD[8] | | |
| 9 | −80.5721 | 1.728 | 1.61800 | 63.33 |
| 10 | 42.6826 | 4.694 | 1.53172 | 48.84 |
| 11 | −25.0831 | DD[11] | | |
| 12 | 27.2603 | 2.418 | 1.62004 | 36.26 |
| 13 | 383.5231 | 0.000 | | |
| 14 | 25.6143 | 0.807 | 1.49700 | 81.54 |
| 15 | 17.5732 | 29.989 | | |
| 16(Aperture Stop) | ∞ | DD[16] | | |
| 17 | 161.0274 | 3.875 | 1.49700 | 81.54 |
| 18 | −14.7190 | 0.054 | | |
| 19 | −14.7218 | 0.538 | 1.77250 | 49.60 |
| 20 | −21.1206 | DD[20] | | |
| 21 | 26.7946 | 0.538 | 1.62004 | 36.26 |
| 22 | 17.1750 | 3.280 | | |
| 23 | −12.6915 | 0.935 | 1.77250 | 49.60 |
| 24 | 28.6702 | 4.026 | 1.49700 | 81.54 |
| 25 | −20.9505 | 0.000 | | |
| 26 | 78.4969 | 5.248 | 1.49700 | 81.54 |
| 27 | −17.1140 | DD[27] | | |
| 28 | 36.5091 | 3.039 | 1.49700 | 81.54 |
| 29 | −110.3778 | 9.687 | | |
| 30 | ∞ | 37.668 | 1.51633 | 64.14 |
| 31 | ∞ | 1.614 | 1.50847 | 61.19 |
| 32 | ∞ | | | |

TABLE 4

Example 2: Data Regarding Zooming

| | Wide Angle End | Intermediate Position | Telephoto End |
|---|---|---|---|
| Zoom Ratio | 1.00 | 1.23 | 1.50 |
| f' | 10.00 | 12.25 | 15.00 |
| Bf | 35.60 | 35.60 | 35.60 |
| FNo. | 2.50 | 2.50 | 2.50 |
| 2ω[°] | 62.8 | 53.4 | 44.6 |
| DD[8] | 6.331 | 4.902 | 3.814 |
| DD[11] | 18.299 | 8.323 | 0.455 |
| DD[16] | 7.399 | 7.655 | 6.453 |
| DD[20] | 0.269 | 6.162 | 14.487 |
| DD[27] | 0.270 | 5.526 | 7.359 |
| Stop Diameter | 12.43 | 14.152 | 16.252 |

A through L of FIG. 12 respectively correspond to the aberration diagrams of the projection zoom lens of Example 2.

Example 3

Figure 3:
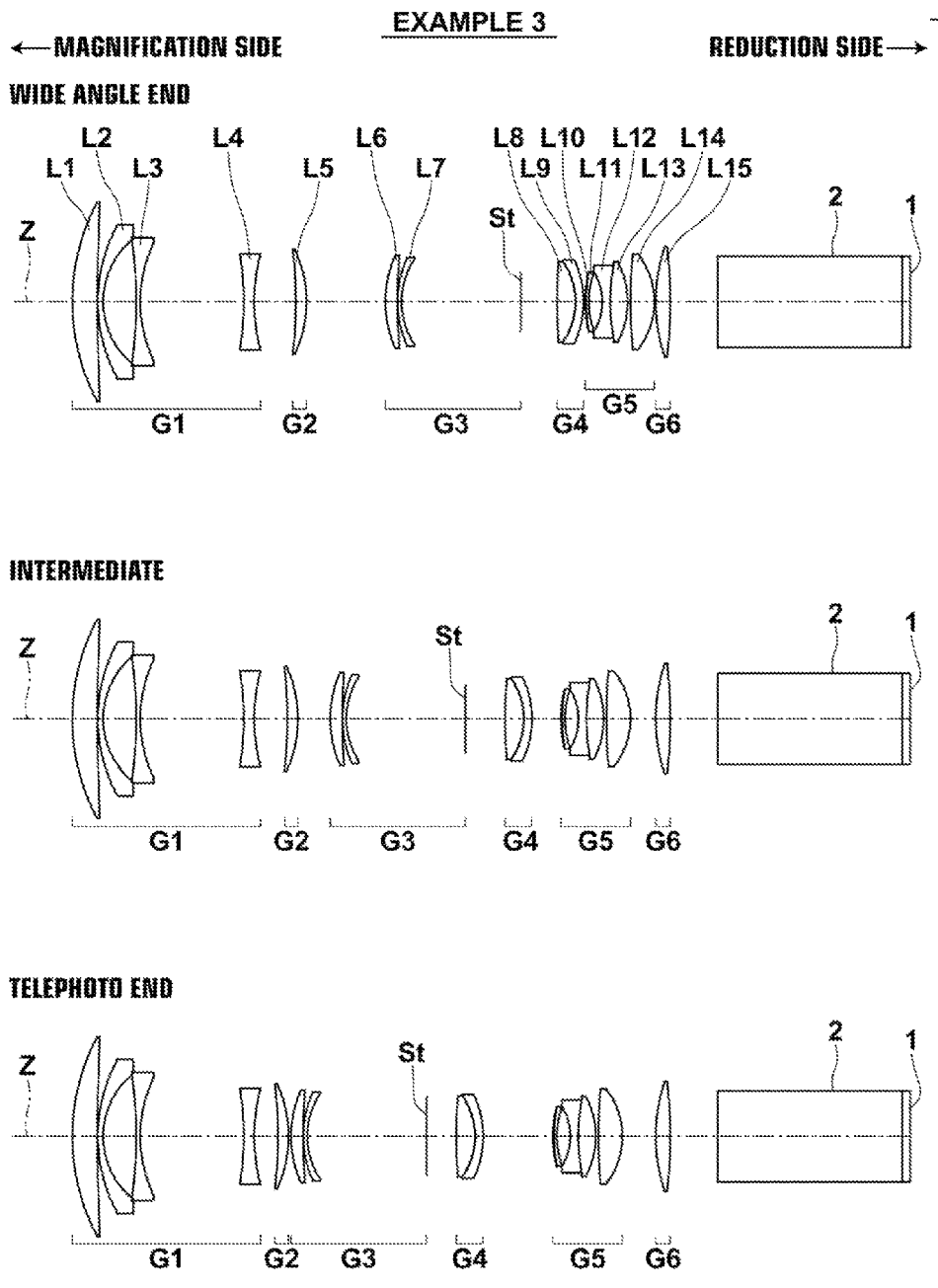
FIG. 3 is a collection of cross-sectional views of a projection zoom lens according to Example 3 of the present invention, illustrating the lens configuration thereof.

FIG. 3 shows a collection of the arrangement of the lens groups in the projection zoom lens of Example 3 at the wide angle end, the telephoto end, and the intermediate position therebetween. In Example 3, the first lens group G1 consists of four lenses: a positive first lens L1, a negative second lens L2, a negative third lens L3, and a negative fourth lens L4 disposed in this order from the magnification side. Further, the second lens group consists of one lens, a positive fifth lens L5.

The third lens group G3 consists of two lenses, i.e., a positive sixth lens L6 and a negative seventh lens L7, and an aperture stop St which is a variable stop disposed in this order from the magnification side. The fourth lens group G4 consists of two lenses: a positive eighth lens L8 and a negative ninth lens L9 disposed in this order from the magnification side.

The fifth lens Group G5 consists of five lenses: a positive tenth lens L10, a negative eleventh lens L11, a negative twelfth lens L12, a positive thirteenth lens L13, and a positive fourteenth lens L14 disposed in this order from the magnification side. The sixth lens group G6 consists of one lens, a positive fifteenth lens L15.

Note that the twelfth lens L12 and the thirteenth lens L13 are cemented to each other. Further, the tenth lens L10, which is formed by a thin resin layer and is bonded to the magnification-side lens surface of the eleventh lens L11, constitutes a hybrid aspherical lens surface.

Table 5 shows the basic lens data of the projection zoom lens of Example 3. Further, Table 6 shows the specs of the projection zoom lens of Example 3 at each of the wide angle end, the intermediate position, and the telephoto end while changing magnification in the same manner as in Table 2. The display items and the manner in which the Table is shown are the same as described above.

In Example 3, the magnification-side lens surface (a surface with the surface number 20) of the tenth lens L10 is an aspherical surface. Table 7 shows data regarding the aspherical surface thereof. The data regarding the aspherical surface in Table 7 shows the surface numbers of the aspherical surfaces and the aspherical surface coefficients of the respective aspherical surfaces. "E-n" (n: integer) shown in the numerical values of the aspheric surface data in Table 7 represents "×10$^{-n}$". The aspherical surface coefficient represents a value of each of the coefficients KA and Am (m=4, 6, 8, 10) in the aspherical surface expression below:

$$Zd = C \cdot h^2 / \{1 + (1 - KA \cdot C^2 \cdot h^2)^{1/2}\} + \Sigma Am \cdot h^m$$

where,
Zd: the depth of an aspheric surface (the length of a perpendicular line drawn from a point on an aspheric surface with a height h to a plane perpendicular to the optical axis which contacts the peak of the aspheric surface)
h: height (the distance from the optical axis to a lens surface)
C: the reciprocal of a paraxial radius of curvature
KA, Am: aspherical surface coefficients (m=4, 6, 8, 10).

TABLE 5

Example 3: Basic Lens Data

| Si Surface Number | Ri Radius of Curvature | Di Distance Between Surfaces | Ndj Refractive Index | vdj Abbe Number |
|---|---|---|---|---|
| 1 | 44.4548 | 5.139 | 1.62299 | 58.16 |
| 2 | 449.9823 | 0.053 | | |
| 3 | 33.6464 | 1.073 | 1.61800 | 63.33 |
| 4 | 16.9420 | 6.722 | | |
| 5 | −96.1192 | 0.858 | 1.80000 | 29.84 |
| 6 | 28.6256 | 21.069 | | |
| 7 | −61.4227 | 2.148 | 1.61800 | 63.33 |
| 8 | 40.3354 | DD[8] | | |
| 9 | −90.4267 | 2.148 | 1.61340 | 44.27 |
| 10 | −26.1910 | DD[10] | | |
| 11 | 23.6952 | 2.490 | 1.62004 | 36.26 |
| 12 | 145.1646 | 0.000 | | |
| 13 | 22.5174 | 0.805 | 1.49700 | 81.54 |
| 14 | 16.1394 | 24.258 | | |
| 15(Aperture Stop) | ∞ | DD[15] | | |
| 16 | 115.8703 | 3.752 | 1.49700 | 81.54 |
| 17 | −14.8330 | 0.054 | | |
| 18 | −14.8044 | 1.611 | 1.84501 | 43.50 |
| 19 | −20.7760 | DD[19] | | |
| *20 | 24.8007 | 0.268 | 1.52771 | 41.85 |

TABLE 5-continued

Example 3: Basic Lens Data

| Si Surface Number | Ri Radius of Curvature | Di Distance Between Surfaces | Ndj Refractive Index | vdj Abbe Number |
|---|---|---|---|---|
| 21 | 35.1740 | 0.536 | 1.84499 | 39.40 |
| 22 | 18.1974 | 2.746 | | |
| 23 | −11.8592 | 1.617 | 1.82521 | 45.48 |
| 24 | 40.1636 | 3.549 | 1.49700 | 81.54 |
| 25 | −18.0499 | 0.591 | | |
| 26 | 131.9405 | 4.852 | 1.49700 | 81.54 |
| 27 | −16.1881 | DD[27] | | |
| 28 | 35.7619 | 2.975 | 1.49700 | 81.54 |
| 29 | −97.0667 | 9.663 | | |
| 30 | ∞ | 37.576 | 1.51633 | 64.14 |
| 31 | ∞ | 1.610 | 1.50847 | 61.19 |
| 32 | ∞ | | | |

*Aspherical Surface

TABLE 6

Example 3: Data Regarding Zooming

| | Wide Angle End | Intermediate Position | Telephoto End |
|---|---|---|---|
| Zoom Ratio | 1.00 | 1.23 | 1.50 |
| f | 10.00 | 12.25 | 15.00 |
| Bf | 35.51 | 35.51 | 35.51 |
| FNo. | 2.50 | 2.50 | 2.50 |
| 2ω[°] | 62.8 | 53.2 | 44.4 |
| DD[8] | 8.470 | 6.755 | 4.831 |
| DD[10] | 16.083 | 6.546 | 0.514 |
| DD[15] | 7.381 | 8.111 | 6.124 |
| DD[19] | 0.268 | 5.916 | 14.223 |
| DD[27] | 0.269 | 5.144 | 6.778 |
| Stop Diameter | 12.232 | 13.932 | 16.194 |

TABLE 7

Example 3: Aspherical Surface Data

| Surface Number | 20 |
|---|---|
| KA | −3.0102846E+00 |
| A4 | 2.4570443E−05 |
| A6 | −1.4061270E−07 |
| A8 | 1.1295324E−09 |
| A10 | −2.1103229E−11 |

Figure 13:
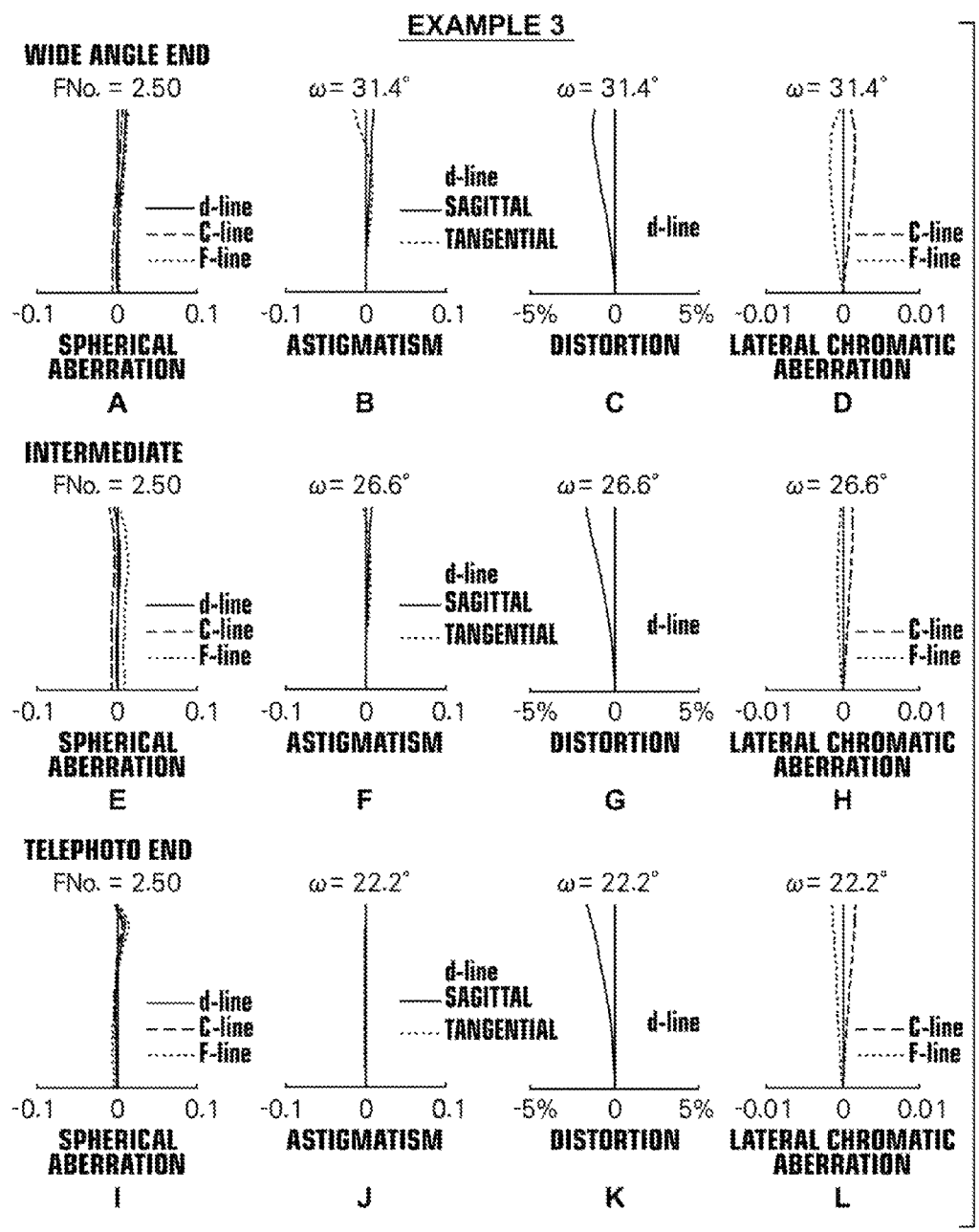
FIG. 13 shows aberration diagrams A through L of the projection zoom lens according to the above Example 3.

A through L of FIG. 13 respectively show the aberration diagrams of the projection zoom lens of Example 3.

Example 4

Figure 4:
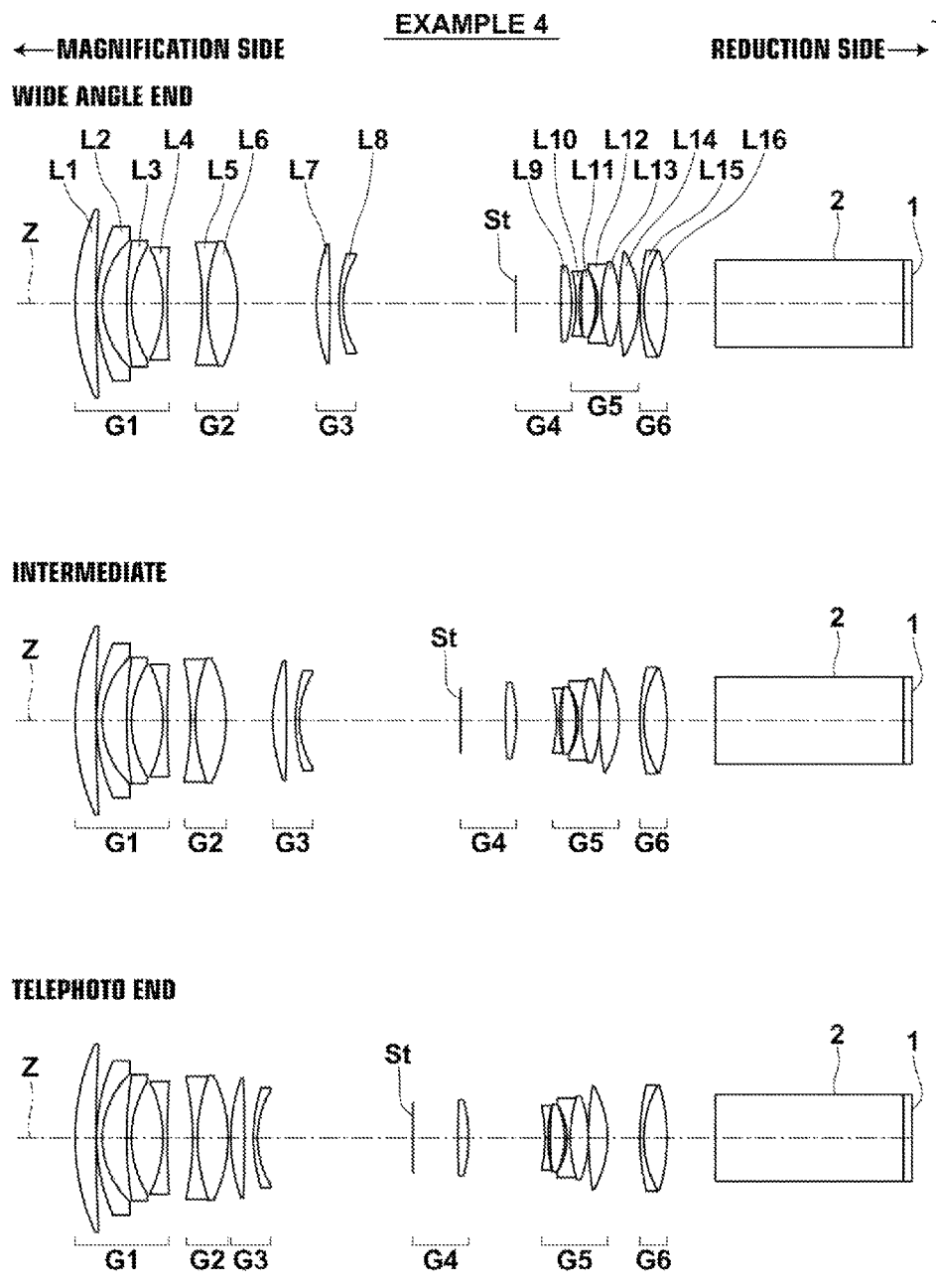
FIG. 4 is a collection of cross-sectional views of a projection zoom lens according to Example 4 of the present invention, illustrating the lens configuration thereof.

FIG. 4 shows a collection of the arrangement of the lens groups in the projection zoom lens of Example 4 at the wide angle end, the telephoto end, and the intermediate position therebetween. In Example 4, the first lens group G1 consists of four lenses: a positive first lens L1, a negative second lens L2, a negative third lens L3, and a negative fourth lens L4 disposed in this order from the magnification side. Further, the second lens group G2 consists of a negative fifth lens L5 and a positive sixth lens L6 disposed in this order from the magnification side.

The third lens group G3 consists of two lenses, a positive seventh lens L7 and a negative eighth lens L8 disposed in this order from the magnification side. The fourth lens group G4 consists of an aperture stop St which is a variable stop and a positive ninth lens L9 in this order from the magnification side.

The fifth lens group G5 consists of five lenses: a negative tenth lens L10, a positive eleventh lens L11, a negative twelfth lens L12, a positive thirteenth lens L13, and a positive fourteenth lens L14 disposed in this order from the magnification side. The sixth lens group G6 consists of two lenses, a negative fifteenth lens L15 and a positive sixteenth lens L16 disposed in this order from the magnification side.

Note that the fifth lens L5 and the sixth lens L6 are cemented to each other. The twelfth lens L12 and the thirteenth lens L13 are cemented to each other. Further, the fifteenth lens L15 and the sixteenth lens L16 are cemented to each other as well.

Table 8 shows the basic lens data of the projection zoom lens of Example 4. Further, Table 9 shows the specs of the projection zoom lens of Example 4 at each of the wide angle end, the intermediate position, and the telephoto end while changing magnification in the same manner as in Table 2. The display items and the manner in which the Table is shown are the same as described above.

TABLE 8

Example 4: Basic Lens Data

| Si Surface Number | Ri Radius of Curvature | Di Distance Between Surfaces | Ndj Refractive Index | νdj Abbe Number |
|---|---|---|---|---|
| 1 | 47.6244 | 4.170 | 1.62299 | 58.16 |
| 2 | 342.8017 | 0.107 | | |
| 3 | 38.4051 | 1.147 | 1.61800 | 63.33 |
| 4 | 17.8824 | 4.848 | | |
| 5 | 82.6651 | 0.965 | 1.71299 | 53.87 |
| 6 | 22.3424 | 6.268 | | |
| 7 | −25.5241 | 0.857 | 1.61800 | 63.33 |
| 8 | 195.3033 | DD[8] | | |
| 9 | −57.4995 | 0.970 | 1.84661 | 23.78 |
| 10 | 36.2694 | 6.107 | 1.74950 | 35.33 |
| 11 | −28.6044 | DD[11] | | |
| 12 | 36.6738 | 2.742 | 1.71736 | 29.52 |
| 13 | −286.0788 | 1.765 | | |
| 14 | 34.3412 | 0.804 | 1.49700 | 81.54 |
| 15 | 18.7183 | DD[15] | | |
| 16(Aperture Stop) | ∞ | 8.975 | | |
| 17 | 139.0259 | 2.143 | 1.49700 | 81.54 |
| 18 | −29.3123 | DD[18] | | |
| 19 | −27.4161 | 0.536 | 1.78800 | 47.37 |
| 20 | 27.6022 | 0.493 | | |
| 21 | 61.9035 | 2.880 | 1.51742 | 52.43 |
| 22 | −16.0045 | 0.454 | | |
| 23 | −12.9940 | 0.648 | 1.78800 | 47.37 |
| 24 | 27.7002 | 3.574 | 1.61800 | 63.33 |
| 25 | −25.4591 | 0.000 | | |
| 26 | 65.3022 | 3.855 | 1.61800 | 63.33 |
| 27 | −21.3736 | DD[27] | | |
| 28 | 46.6856 | 0.755 | 1.71299 | 53.87 |
| 29 | 21.6274 | 4.635 | 1.49700 | 81.54 |
| 30 | −37.7068 | 9.646 | | |
| 31 | ∞ | 37.509 | 1.51633 | 64.14 |
| 32 | ∞ | 1.608 | 1.50847 | 61.19 |
| 33 | ∞ | | | |

TABLE 9

Example 4: Data Regarding Zooming

| | Wide Angle End | Intermediate Position | Telephoto End |
|---|---|---|---|
| Zoom Ratio | 1.00 | 1.20 | 1.43 |
| f | 10.00 | 11.96 | 14.30 |
| Bf | 35.45 | 35.45 | 35.45 |
| FNo. | 2.50 | 2.50 | 2.50 |
| 2ω[°] | 62.8 | 54.2 | 46.2 |
| DD[8] | 6.954 | 4.636 | 5.053 |

TABLE 9-continued

Example 4: Data Regarding Zooming

| | Wide Angle End | Intermediate Position | Telephoto End |
|---|---|---|---|
| DD[11] | 15.673 | 9.320 | 0.531 |
| DD[15] | 34.389 | 32.115 | 30.937 |
| DD[18] | 0.931 | 7.963 | 15.246 |
| DD[27] | 0.269 | 4.183 | 6.449 |
| Stop Diameter | 11.298 | 12.734 | 14.12 |

A through L of FIG. 14 respectively correspond to the aberration diagrams of the projection zoom lens of Example 4.

Example 5

FIG. 5 shows a collection of the arrangement of the lens groups in the projection zoom lens of Example 5 at the wide angle end, the telephoto end, and the intermediate position therebetween. In Example 5, the first lens group G1 consists of four lenses: a positive first lens L1, a negative second lens L2, a negative third lens L3, and a negative fourth lens L4 disposed in this order from the magnification side. Further, the second lens group G2 consists of a negative fifth lens L5 and a positive sixth lens L6 disposed in this order from the magnification side.

The third lens group G3 consists of two lenses, a positive seventh lens L7 and a negative eighth lens L8 disposed in this order from the magnification side. The fourth lens group G4 consists of an aperture stop St which is a variable stop and a positive ninth lens L9 in this order from the magnification side.

The fifth lens group G5 consists of five lenses: a negative tenth lens L10, a positive eleventh lens L11, a negative twelfth lens L12, a positive thirteenth lens L13, and a positive fourteenth lens L14 disposed in this order from the magnification side. The sixth lens group G6 consists of one lens, a positive fifteenth lens L15.

Note that the fifth lens L5 and the sixth lens L6 are cemented to each other. The twelfth lens L12 and the thirteenth lens L13 are cemented to each other as well.

Table 10 shows the basic lens data of the projection zoom lens of Example 5. Further, Table 11 shows the specs of the projection zoom lens of Example 5 at each of the wide angle end, the intermediate position, and the telephoto end while changing magnification in the same manner as in Table 2. The display items and the manner in which the Table is shown are the same as described above.

TABLE 10

Example 5: Basic Lens Data

| Si Surface Number | Ri Radius of Curvature | Di Distance Between Surfaces | Ndj Refractive Index | νdj Abbe Number |
|---|---|---|---|---|
| 1 | 47.0437 | 3.350 | 1.67003 | 47.23 |
| 2 | 330.2142 | 0.097 | | |
| 3 | 34.7902 | 1.015 | 1.62299 | 58.16 |
| 4 | 16.7348 | 3.911 | | |
| 5 | 117.0256 | 0.890 | 1.62041 | 60.29 |
| 6 | 22.4972 | 4.230 | | |
| 7 | −32.0741 | 0.774 | 1.62299 | 58.16 |
| 8 | 60.4108 | DD[8] | | |
| 9 | −119.2924 | 0.779 | 1.84661 | 23.78 |
| 10 | 24.8416 | 5.371 | 1.73800 | 32.26 |
| 11 | −37.2610 | DD[11] | | |
| 12 | 34.9176 | 2.678 | 1.74950 | 35.28 |
| 13 | −188.1975 | 6.730 | | |
| 14 | 25.4222 | 0.725 | 1.48749 | 70.23 |
| 15 | 14.8481 | DD[15] | | |

TABLE 10-continued

Example 5: Basic Lens Data

| Si Surface Number | Ri Radius of Curvature | Di Distance Between Surfaces | Ndj Refractive Index | vdj Abbe Number |
|---|---|---|---|---|
| 16(Aperture Stop) | ∞ | 7.735 | | |
| 17 | 113.1459 | 2.379 | 1.49700 | 81.54 |
| 18 | −24.3331 | DD[18] | | |
| 19 | −21.3273 | 0.532 | 1.74320 | 49.34 |
| 20 | 26.4153 | 0.450 | | |
| 21 | 65.3902 | 3.128 | 1.51633 | 64.14 |
| 22 | −13.4188 | 0.280 | | |
| 23 | −11.7678 | 0.633 | 1.77250 | 49.60 |
| 24 | 71.5360 | 3.486 | 1.49700 | 81.54 |
| 25 | −18.6012 | 0.793 | | |
| 26 | 124.6524 | 4.046 | 1.49700 | 81.54 |
| 27 | −17.0531 | DD[27] | | |
| 28 | 39.7147 | 2.683 | 1.49700 | 81.54 |
| 29 | −63.1218 | 8.717 | | |
| 30 | ∞ | 33.841 | 1.51633 | 64.14 |
| 31 | ∞ | 1.450 | 1.50847 | 61.19 |
| 32 | ∞ | | | |

TABLE 11

Example 5: Data Regarding Zooming

| | Wide Angle End | Intermediate Position | Telephoto End |
|---|---|---|---|
| Zoom Ratio | 1.00 | 1.32 | 1.58 |
| f | 10.00 | 13.20 | 15.80 |
| Bf | 0.01 | 0.01 | 0.01 |
| FNo. | 2.50 | 2.50 | 2.50 |
| 2ω[°] | 57.8 | 45.2 | 38.4 |
| DD[8] | 11.670 | 8.093 | 7.465 |
| DD[11] | 15.386 | 6.207 | 0.578 |
| DD[15] | 21.430 | 19.285 | 17.350 |
| DD[18] | 0.941 | 9.383 | 16.288 |
| DD[27] | 0.244 | 6.704 | 7.991 |
| Stop Diameter | 10.142 | 12.2748 | 13.7542 |

Figure 15:
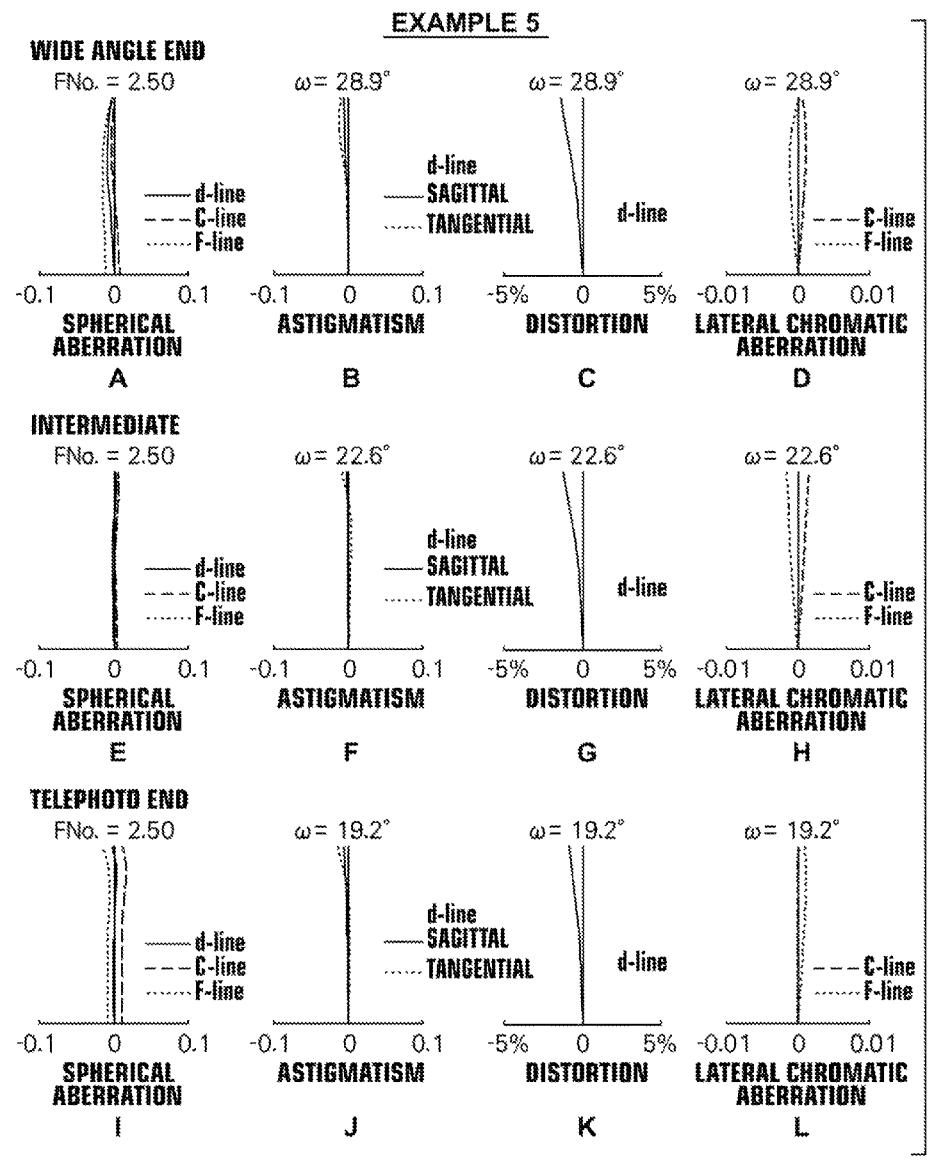
FIG. 15 shows aberration diagrams A through L of the projection zoom lens according to the above Example 5.

A through L of FIG. 15 respectively correspond to the aberration diagrams of the projection zoom lens of Example 5.

Example 6

Figure 6:
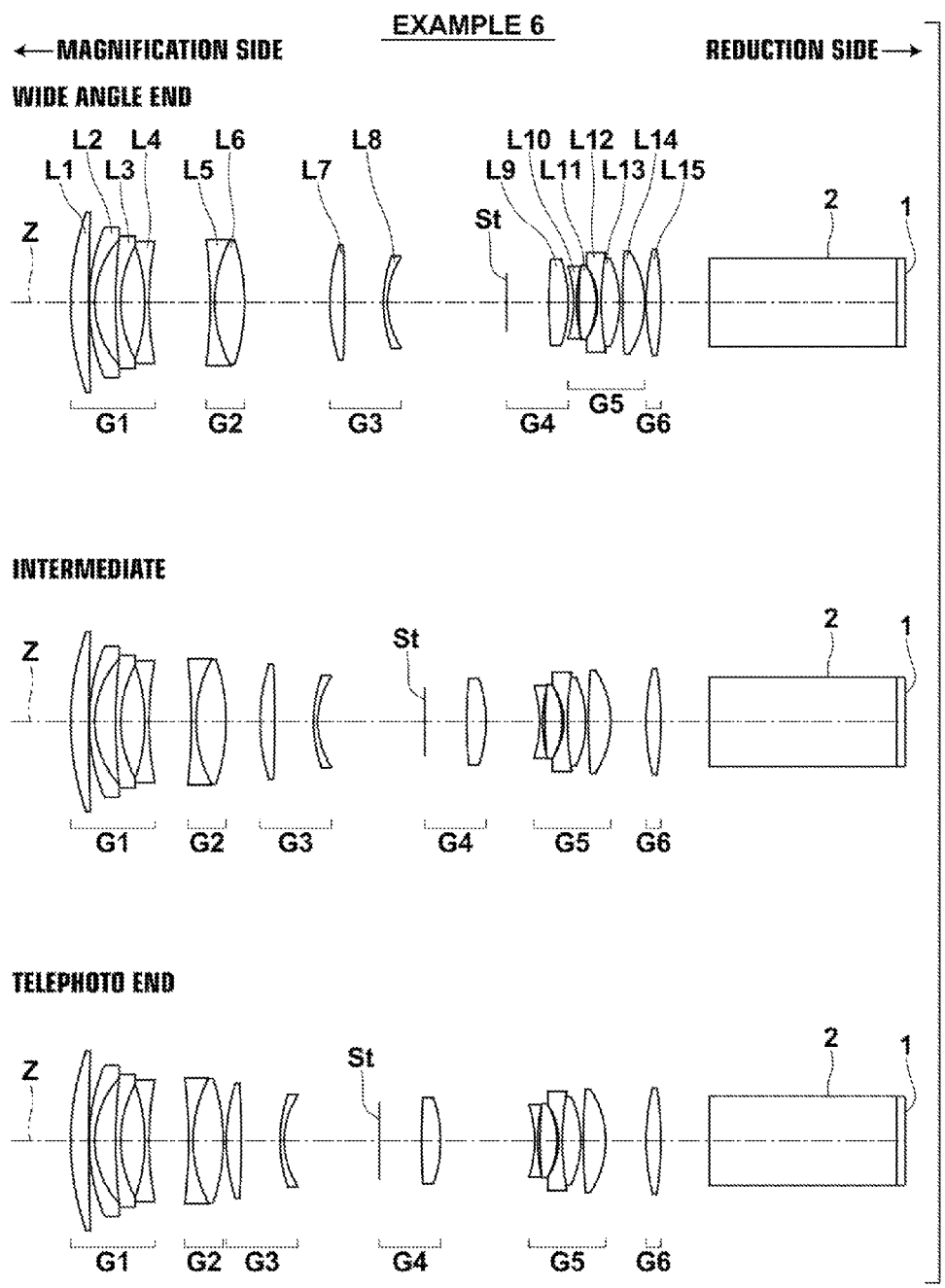
FIG. 6 is a collection of cross-sectional views of a projection zoom lens according to Example 6 of the present invention, illustrating the lens configuration thereof.

FIG. 6 shows a collection of the arrangement of the lens groups in the projection zoom lens of Example 6 at the wide angle end, the telephoto end, and the intermediate position therebetween. In Example 6, the first lens group G1 consists of four lenses: a positive first lens L1, a negative second lens L2, a negative third lens L3, and a negative fourth lens L4 disposed in this order from the magnification side. Further, the second lens group G2 consists of a negative fifth lens L5 and a positive sixth lens L6 disposed in this order from the magnification side.

The third lens group G3 consists of two lenses, a positive seventh lens L7 and a negative eighth lens L8 disposed in this order from the magnification side. The fourth lens group G4 consists of an aperture stop St which is a variable stop and a positive ninth lens L9 in this order from the magnification side.

The fifth lens group G5 consists of five lenses: a negative tenth lens L10, a positive eleventh lens L11, a negative twelfth lens L12, a positive thirteenth lens L13, and a positive fourteenth lens L14 disposed in this order from the magnification side. The sixth lens group G6 consists of one lens, a positive fifteenth lens L15.

Note that the fifth lens L5 and the sixth lens L6 are cemented to each other. The twelfth lens L12 and the thirteenth lens L13 are cemented to each other.

Table 12 shows the basic lens data of the projection zoom lens of Example 6. Further, Table 13 shows the specs of the projection zoom lens of Example 6 at each of the wide angle end, the intermediate position, and the telephoto end while changing magnification in the same manner as in Table 2. The display items and the manner in which the Table is shown are the same as described above.

TABLE 12

Example 6: Basic Lens Data

| Si Surface Number | Ri Radius of Curvature | Di Distance Between Surfaces | Ndj Refractive Index | vdj Abbe Number |
|---|---|---|---|---|
| 1 | 50.0884 | 3.237 | 1.70154 | 41.24 |
| 2 | 384.8019 | 0.097 | | |
| 3 | 35.9455 | 1.015 | 1.63854 | 55.38 |
| 4 | 17.3466 | 3.760 | | |
| 5 | 108.3901 | 0.894 | 1.62041 | 60.29 |
| 6 | 21.7691 | 4.354 | | |
| 7 | −31.7646 | 0.774 | 1.58913 | 61.14 |
| 8 | 60.9474 | DD[8] | | |
| 9 | −96.9782 | 0.827 | 1.84661 | 23.78 |
| 10 | 24.7320 | 5.402 | 1.73800 | 32.26 |
| 11 | −36.3082 | DD[11] | | |
| 12 | 34.6544 | 2.666 | 1.74950 | 35.28 |
| 13 | −217.1542 | 7.002 | | |
| 14 | 25.6579 | 0.725 | 1.48749 | 70.23 |
| 15 | 15.0992 | DD[15] | | |
| 16(Aperture Stop) | ∞ | 7.614 | | |
| 17 | 111.3602 | 3.449 | 1.49700 | 81.54 |
| 18 | −24.7471 | DD[18] | | |
| 19 | −21.5612 | 0.532 | 1.72916 | 54.68 |
| 20 | 27.6715 | 0.429 | | |
| 21 | 63.9589 | 3.097 | 1.48749 | 70.23 |
| 22 | −13.5757 | 0.290 | | |
| 23 | −11.9088 | 0.633 | 1.78800 | 47.37 |
| 24 | 50.0219 | 3.319 | 1.53715 | 74.81 |
| 25 | −19.6002 | 0.484 | | |
| 26 | 121.8129 | 4.030 | 1.53715 | 74.81 |
| 27 | −17.3652 | DD[27] | | |
| 28 | 39.9649 | 2.651 | 1.49700 | 81.54 |
| 29 | −64.6217 | 8.716 | | |
| 30 | ∞ | 33.841 | 1.51633 | 64.14 |
| 31 | ∞ | 1.450 | 1.50847 | 61.19 |
| 32 | ∞ | | | |

TABLE 13

Example 6: Data Regarding Zooming

| | Wide Angle End | Intermediate Position | Telephoto End |
|---|---|---|---|
| Zoom Ratio | 1.00 | 1.32 | 1.58 |
| f | 10.00 | 13.20 | 15.80 |
| Bf | 0.01 | 0.01 | 0.01 |
| FNo. | 2.50 | 2.50 | 2.50 |
| 2ω[°] | 57.8 | 45.2 | 38.2 |
| DD[8] | 10.981 | 7.638 | 7.110 |
| DD[11] | 15.359 | 6.112 | 0.579 |
| DD[15] | 21.494 | 19.273 | 17.158 |
| DD[18] | 0.972 | 9.667 | 16.934 |
| DD[27] | 0.250 | 6.366 | 7.275 |
| Stop Diameter | 10.217 | 12.3132 | 13.7752 |

Figure 16:
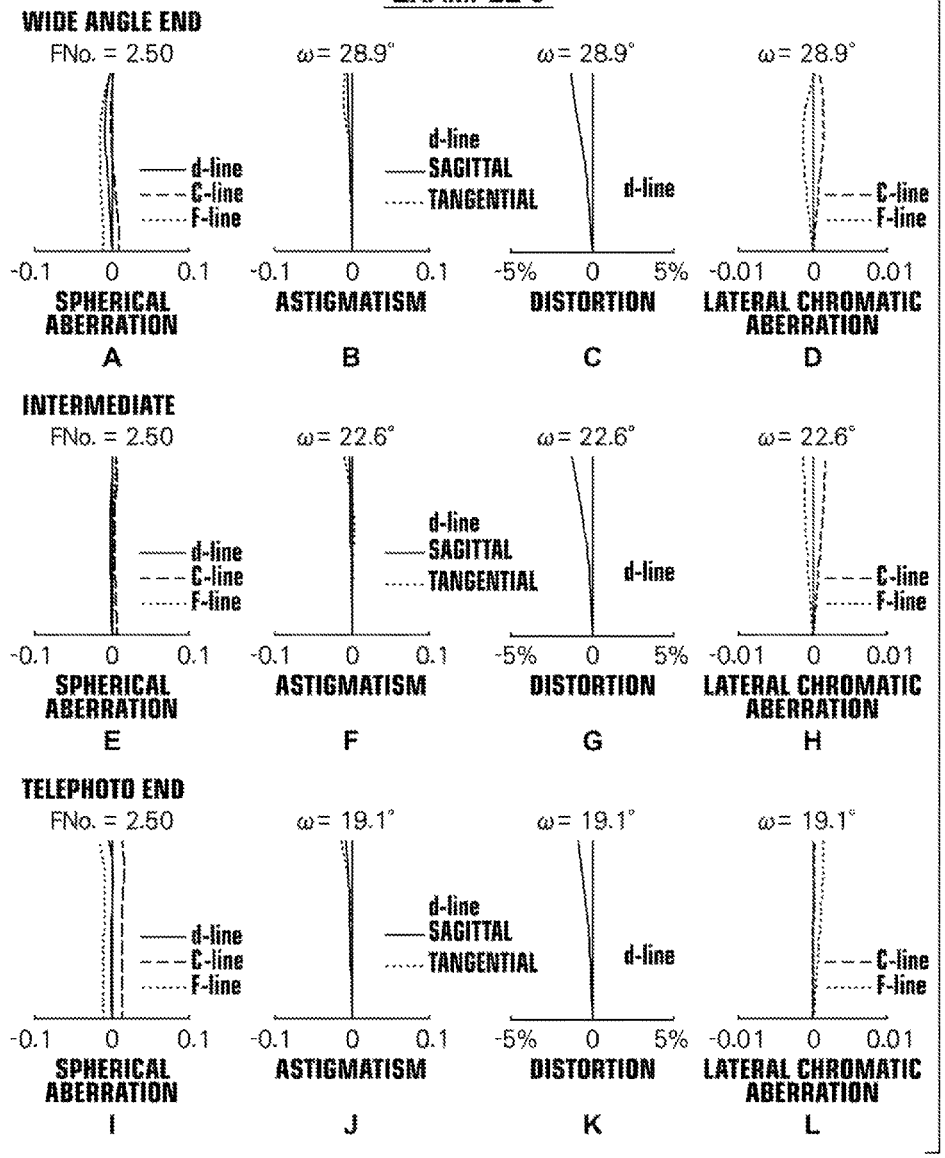
FIG. 16 shows aberration diagrams A through L of the projection zoom lens according to the above Example 6.

A through L of FIG. 16 respectively correspond to the aberration diagrams of the projection zoom lens of Example 6.

Example 7

FIG. 7 shows a collection of the arrangement of the lens groups in the projection zoom lens of Example 7 at the wide angle end, the telephoto end, and the intermediate position therebetween.

The projection zoom lens of Example 7 consists of a first lens group G1 having a negative refractive power, a second lens group G2 having a positive refractive power, a third lens group G3 having a positive refractive power, a fourth lens group G4 having a positive refractive power, a fifth lens group G5 having a positive refractive power, and a sixth lens group G6 having a positive refractive power as substantial lens groups. The first lens group G1 is disposed at the most-magnification side and fixed while changing magnification, and the second lens group G2 is disposed next to the first lens group G1 at the reduction side and caused to move while changing magnification. The third lens group G3 is disposed next to the second lens group G2 at the reduction side and caused to move while changing magnification, and the fourth lens group G4 is disposed next to the third lens group G3 at the reduction side and caused to move while changing magnification. The fifth lens group G5 is disposed next to the fourth lens group G4 at the reduction side and caused to move while changing magnification, and the sixth lens group G6 is disposed at the most-reduction side and fixed while changing magnification. Further, the projection zoom lens is configured to be telecentric at the reduction side. The configuration of the lens groups described above is the same as those in Examples 7, 8, and 10.

In Example 7, the first lens group G1 consists of three lenses: a positive first lens L1, a negative second lens L2, and a negative third lens L3 disposed in this order from the magnification side. Further, the second lens group G2 consists of a negative fourth lens L4 and a positive fifth lens L5 disposed in this order from the magnification side.

The third lens group G3 consists of a positive sixth lens L6 and a negative seventh lens L7 disposed in this order from the magnification side. The fourth lens group G4 consists of one lens, a positive eighth lens L8.

The fifth lens group G5 consists of an aperture stop St which is a variable stop, and five lenses: a negative ninth lens L9, a positive tenth lens L10, a negative eleventh lens L11, a positive twelfth lens L12, and a positive thirteenth lens L13 disposed in this order from the magnification side. The sixth lens group G6 consists of one lens, a positive fourteenth lens L14.

Note that the fourth lens L4 and the fifth lens L5 are cemented to each other. Further, the eleventh lens L11 and the twelfth lens L12 are cemented to each other.

Table 14 shows the basic lens data of the projection zoom lens of Example 7. Further, Table 15 shows the specs of the projection zoom lens of Example 7 at each of the wide angle end, the intermediate position, and the telephoto end while changing magnification in the same manner as in Table 2.

TABLE 14

Example 7: Basic Lens Data

| Si Surface Number | Ri Radius of Curvature | Di Distance Between Surfaces | Ndj Refractive Index | vdj Abbe Number |
|---|---|---|---|---|
| 1 | 57.1672 | 2.570 | 1.63854 | 55.38 |
| 2 | −119.3632 | 1.522 | | |
| 3 | 28.2685 | 1.054 | 1.77250 | 49.60 |
| 4 | 13.3522 | 3.773 | | |
| 5 | −22.6907 | 0.851 | 1.80518 | 25.42 |
| 6 | 30.2483 | DD[6] | | |
| 7 | −16.7245 | 0.871 | 1.63854 | 55.38 |
| 8 | −72.0209 | 2.441 | 1.73800 | 32.26 |
| 9 | −16.5806 | DD[9] | | |
| 10 | 40.8653 | 2.529 | 1.72047 | 34.71 |
| 11 | −40.8653 | 0.130 | | |
| 12 | −35.7758 | 0.758 | 1.62004 | 36.26 |
| 13 | −100.5522 | DD[13] | | |
| 14 | 33.8872 | 2.758 | 1.49700 | 81.54 |
| 15 | −50.9500 | DD[15] | | |
| 16(Aperture Stop) | ∞ | 1.986 | | |
| 17 | −20.9424 | 1.162 | 1.51742 | 52.43 |
| 18 | 16.4127 | 0.583 | | |
| 19 | 56.7932 | 3.028 | 1.48749 | 70.23 |
| 20 | −8.2620 | 0.021 | | |
| 21 | −8.1912 | 1.196 | 1.78800 | 47.37 |
| 22 | 43.9783 | 3.875 | 1.49700 | 81.54 |
| 23 | −17.3897 | 0.081 | | |
| 24 | 77.6965 | 4.212 | 1.49700 | 81.54 |
| 25 | −15.0184 | DD[25] | | |
| 26 | 43.2833 | 1.986 | 1.49700 | 81.54 |
| 27 | −57.6954 | 7.164 | | |
| 28 | ∞ | 27.804 | 1.51633 | 64.14 |
| 29 | ∞ | 1.192 | 1.50847 | 61.19 |
| 30 | ∞ | | | |

TABLE 15

Example 7: Data Regarding Zooming

| | Wide Angle End | Intermediate Position | Telephoto End |
|---|---|---|---|
| Zoom Ratio | 1.00 | 1.30 | 1.67 |
| f | 10.00 | 13.00 | 16.70 |
| Bf | 26.29 | 26.29 | 26.29 |
| FNo. | 2.50 | 2.50 | 2.50 |
| 2ω[°] | 48.6 | 38.2 | 30.0 |
| DD[6] | 5.724 | 5.401 | 4.531 |
| DD[9] | 12.639 | 4.689 | 1.585 |
| DD[13] | 30.119 | 26.939 | 19.126 |
| DD[15] | 0.794 | 8.305 | 15.670 |
| DD[25] | 0.475 | 4.417 | 8.839 |
| Stop Diameter | 8.768 | 9.180 | 9.644 |

A through L of FIG. 17 respectively correspond to the aberration diagrams of the projection zoom lens of Example 7.

Example 8

Figure 8:
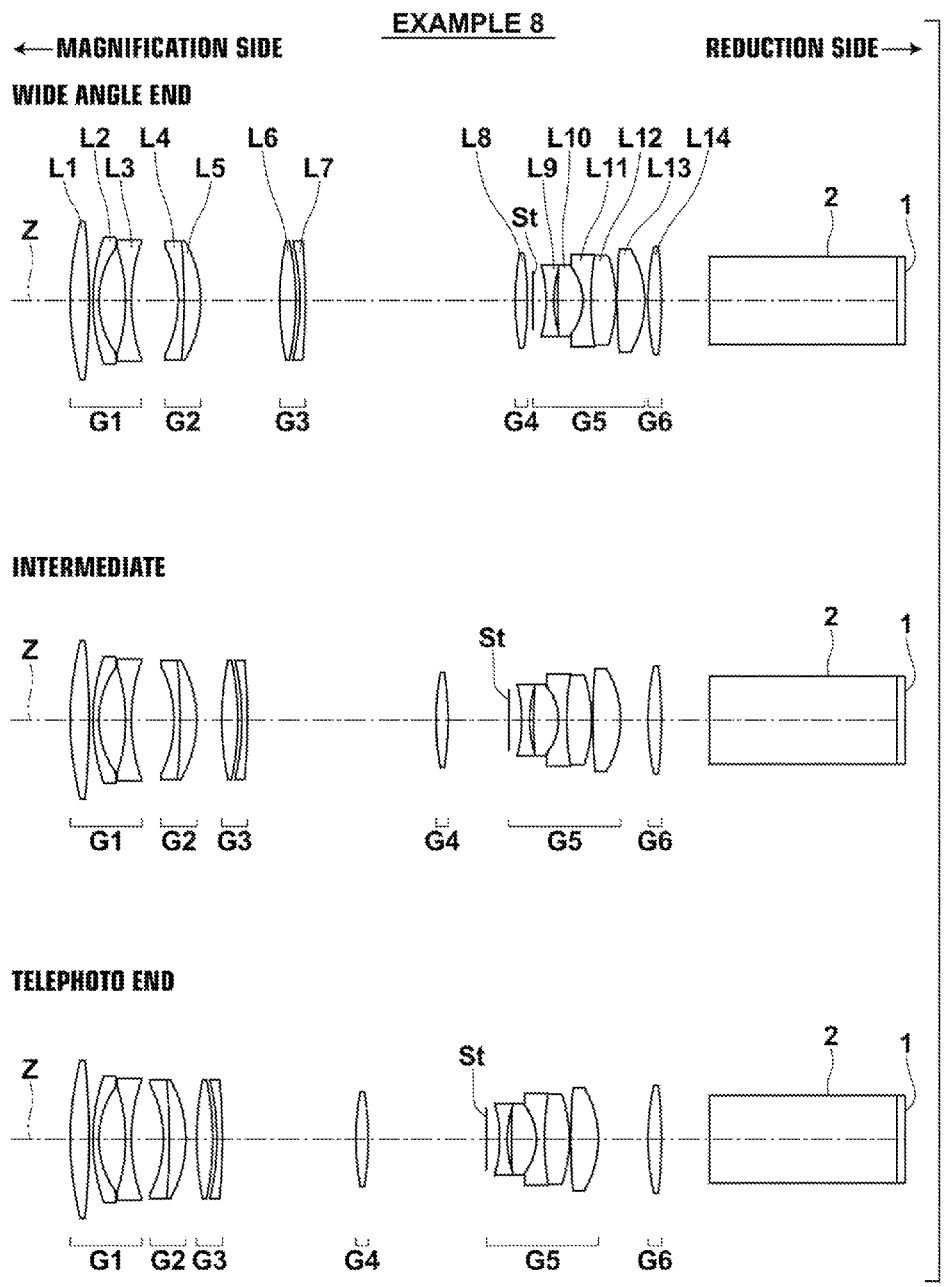
FIG. 8 is a collection of cross-sectional views of a projection zoom lens according to Example 8 of the present invention, illustrating the lens configuration thereof.

FIG. 8 shows a collection of the arrangement of the lens groups in the projection zoom lens of Example 8 at the wide angle end, the telephoto end, and the intermediate position therebetween. In Example 8, the first lens group G1 consists of three lenses: a positive first lens L1, a negative second lens L2, and a negative third lens L3 disposed in this order from the magnification side. Further, the second lens group G2 consists of a negative fourth lens L4 and a positive fifth lens L5 disposed in this order from the magnification side.

The third lens group G3 consists of a positive sixth lens L6 and a negative seventh lens L7 disposed in this order from the magnification side. The fourth lens group G4 consists of one lens, a positive eighth lens L8.

The fifth lens group G5 consists of the aperture stop St which is a variable stop, and five lenses: a negative ninth lens L9, a positive tenth lens L10, a negative eleventh lens L11, a positive twelfth lens L12, and a positive thirteenth lens L13 disposed in this order from the magnification side. The sixth lens group G6 consists of one lens, a positive fourteenth lens L14.

Note that the fourth lens L4 and the fifth lens L5 are cemented to each other. The eleventh lens L11 and the twelfth lens L12 are cemented to each other as well.

Table 16 shows the basic lens data of the projection zoom lens of Example 8. Further, Table 17 shows the specs of the projection zoom lens of Example 8 at each of the wide angle end, the intermediate position, and the telephoto end while changing magnification in the same manner as in Table 2.

TABLE 16

Example 8: Basic Lens Data

| Si Surface Number | Ri Radius of Curvature | Di Distance Between Surfaces | Ndj Refractive Index | vdj Abbe Number |
|---|---|---|---|---|
| 1 | 49.0359 | 2.779 | 1.63854 | 55.38 |
| 2 | −115.0091 | 0.582 | | |
| 3 | 29.1697 | 0.884 | 1.71299 | 53.87 |
| 4 | 13.8954 | 3.946 | | |
| 5 | −25.7555 | 0.851 | 1.80518 | 25.42 |
| 6 | 26.7993 | DD[6] | | |
| 7 | −17.9988 | 0.897 | 1.62299 | 58.16 |
| 8 | −98.3079 | 2.461 | 1.73800 | 32.26 |
| 9 | −18.2535 | DD[9] | | |
| 10 | 44.0536 | 2.374 | 1.72047 | 34.71 |
| 11 | −44.0536 | 0.643 | | |
| 12 | −37.9866 | 0.788 | 1.60342 | 38.03 |
| 13 | −101.6000 | DD[13] | | |
| 14 | 40.6142 | 1.795 | 1.49700 | 81.54 |
| 15 | −44.7319 | DD[15] | | |
| 16(Aperture Stop) | ∞ | 1.986 | | |
| 17 | −19.8048 | 1.144 | 1.51742 | 52.43 |
| 18 | 16.9153 | 0.589 | | |
| 19 | 90.5883 | 3.688 | 1.53715 | 74.81 |
| 20 | −8.1797 | 0.020 | | |
| 21 | −8.1196 | 1.195 | 1.78800 | 47.37 |
| 22 | 40.3923 | 3.698 | 1.53715 | 74.81 |
| 23 | −20.8848 | 0.207 | | |
| 24 | 96.4056 | 4.111 | 1.53715 | 74.81 |
| 25 | −15.2648 | DD[25] | | |
| 26 | 37.1467 | 1.986 | 1.49700 | 81.54 |
| 27 | −71.0526 | 7.159 | | |
| 28 | ∞ | 27.802 | 1.51633 | 64.14 |
| 29 | ∞ | 1.192 | 1.50847 | 61.19 |
| 30 | ∞ | | | |

TABLE 17

Example 8: Data Regarding Zooming

| | Wide Angle End | Intermediate Position | Telephoto End |
|---|---|---|---|
| Zoom Ratio | 1.00 | 1.30 | 1.67 |
| f' | 10.00 | 13.00 | 16.70 |
| Bf | 26.28 | 26.28 | 26.28 |
| FNo. | 2.50 | 2.50 | 2.50 |
| 2ω[°] | 48.6 | 38.2 | 30.0 |
| DD[6] | 6.950 | 6.347 | 4.749 |
| DD[9] | 11.715 | 3.713 | 1.588 |
| DD[13] | 31.178 | 28.028 | 19.856 |
| DD[15] | 0.794 | 8.957 | 17.554 |
| DD[25] | 0.475 | 4.067 | 7.365 |
| Stop Diameter | 8.614 | 8.976 | 9.308 |

A through L of FIG. 18 respectively correspond to the aberration diagrams of the projection zoom lens of Example 8.

Example 9

Figure 9:
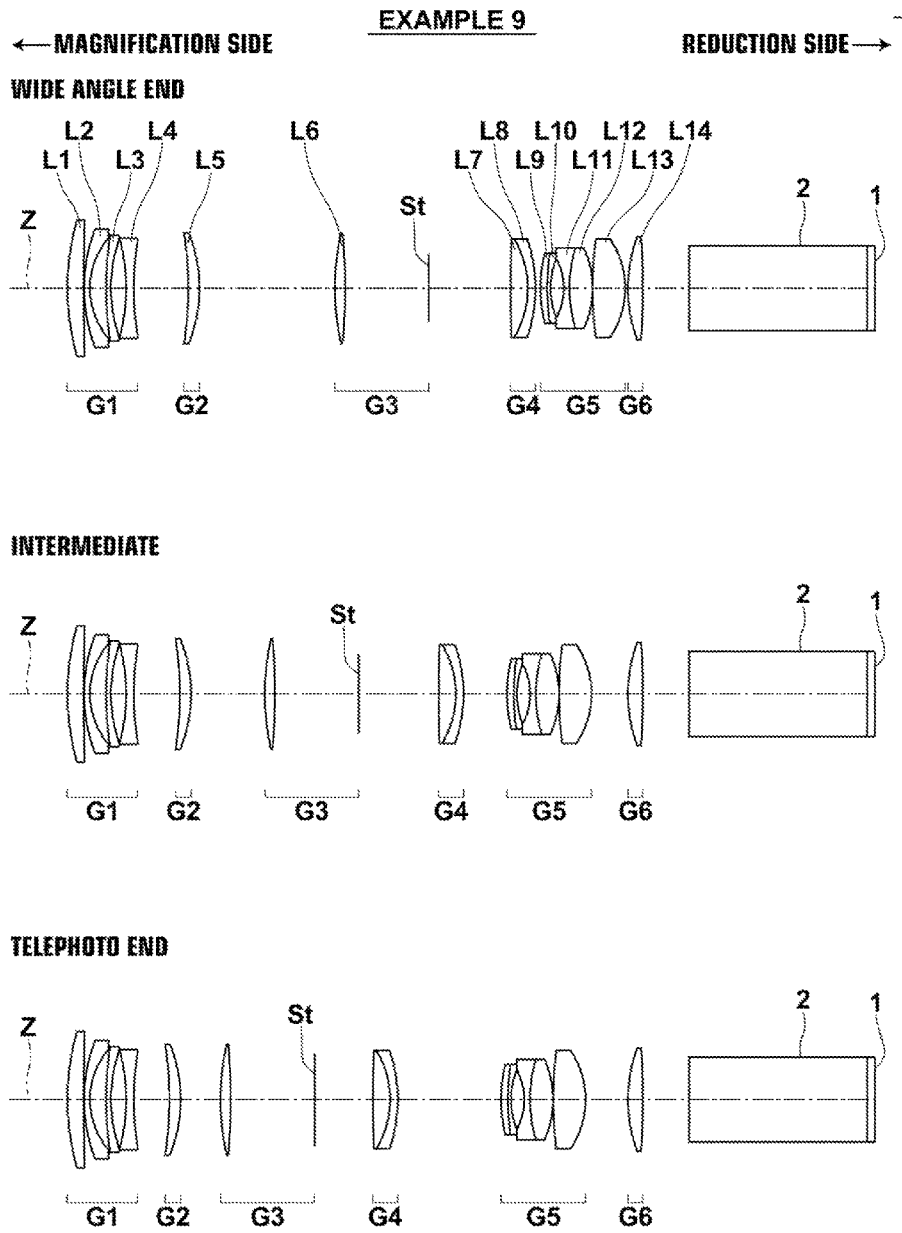
FIG. 9 is a collection of cross-sectional views of a projection zoom lens according to Example 9 of the present invention, illustrating the lens configuration thereof.

FIG. 9 shows a collection of the arrangement of the lens groups in the projection zoom lens of Example 9 at the wide angle end, the telephoto end, and the intermediate position therebetween.

In Example 9, the first lens group G1 consists of four lenses: a positive first lens L1, a negative second lens L2, a negative third lens L3, and a negative fourth lens L4 disposed in this order from the magnification side. Further, the second lens group G2 consists of one lens, a positive fifth lens L5.

The third lens group G3 consists of a positive sixth lens L6 and an aperture stop St which is a variable stop disposed in this order from the magnification side. The fourth lens group G4 consists of a positive seventh lens L7 and a negative eighth lens L8 disposed in this order from the magnification side.

The fifth lens group G5 consists of five lenses: a positive ninth lens L9, a negative tenth lens L10, a negative eleventh lens L11, a positive twelfth lens L12, and a positive thirteenth lens L13 disposed in this order from the magnification side. The sixth lens group G6 consists of one lens, a positive fourteenth lens L14.

Note that the seventh lens L7 and the eighth lens L8 are cemented to each other, and the ninth lens L9 and the tenth lens L10 are cemented to each other. Further, the eleventh lens L11 and the twelfth lens L12 are cemented to each other as well, Table 18 shows the basic lens data of the projection zoom lens of Example 9. Further, Table 19 shows the specs of the projection zoom lens of Example 9 at each of the wide angle end, the intermediate position, and the telephoto end while changing magnification in the same manner as in Table 2.

TABLE 18

Example 9: Basic Lens Data

| Si Surface Number | Ri Radius of Curvature | Di Distance Between Surfaces | Ndj Refractive Index | vdj Abbe Number |
|---|---|---|---|---|
| 1 | 36.6537 | 2.354 | 1.51742 | 52.43 |
| 2 | 409.7181 | 0.073 | | |
| 3 | 24.3742 | 0.837 | 1.61800 | 63.33 |
| 4 | 11.4347 | 2.343 | | |
| 5 | 51.1421 | 0.691 | 1.72342 | 37.95 |
| 6 | 21.8063 | 2.201 | | |
| 7 | −27.5096 | 1.105 | 1.80518 | 25.42 |
| 8 | 44.0155 | DD[8] | | |
| 9 | −52.9373 | 1.623 | 1.80518 | 25.42 |
| 10 | −21.6979 | DD[10] | | |
| 11 | 36.1926 | 1.473 | 1.60562 | 43.70 |
| 12 | −91.0090 | 12.119 | | |
| 13(Aperture Stop) | ∞ | DD[13] | | |
| 14 | 214.2251 | 2.501 | 1.58913 | 61.14 |
| 15 | −13.9810 | 1.105 | 1.83400 | 37.16 |
| 16 | −22.2201 | DD[16] | | |
| 17 | 21.9256 | 0.978 | 1.48749 | 70.23 |
| 18 | 34.1474 | 0.471 | 1.58144 | 40.75 |
| 19 | 12.0969 | 1.901 | | |
| 20 | −9.3490 | 0.839 | 1.80400 | 46.58 |
| 21 | 20.7715 | 3.334 | 1.49700 | 81.54 |
| 22 | −14.3296 | 0.000 | | |
| 23 | 56.3479 | 4.692 | 1.49700 | 81.54 |
| 24 | −13.0569 | DD[24] | | |
| 25 | 22.7265 | 2.145 | 1.49700 | 81.54 |
| 26 | −106.1534 | 6.623 | | |
| 27 | ∞ | 25.779 | 1.51633 | 64.14 |
| 28 | ∞ | 1.105 | 1.50847 | 61.19 |
| 29 | ∞ | | | |

TABLE 19

Example 9: Data Regarding Zooming

|  | Wide Angle End | Intermediate Position | Telephoto End |
|---|---|---|---|
| Zoom Ratio | 1.00 | 1.30 | 1.66 |
| f | 10.00 | 13.00 | 16.60 |
| Bf | 24.36 | 24.36 | 24.36 |
| FNo. | 2.30 | 2.30 | 2.30 |
| 2ω[°] | 46.4 | 36.6 | 29.0 |
| DD[8] | 7.873 | 6.648 | 5.152 |
| DD[10] | 19.566 | 10.652 | 5.744 |
| DD[13] | 11.799 | 11.526 | 8.440 |
| DD[16] | 0.732 | 6.283 | 14.926 |
| DD[24] | 0.438 | 5.298 | 6.147 |
| Stop Diameter | 9.834 | 11.338 | 13.274 |

A through L of FIG. 19 respectively correspond to the aberration diagrams of the projection zoom lens of Example 9.

Example 10

Figure 10:
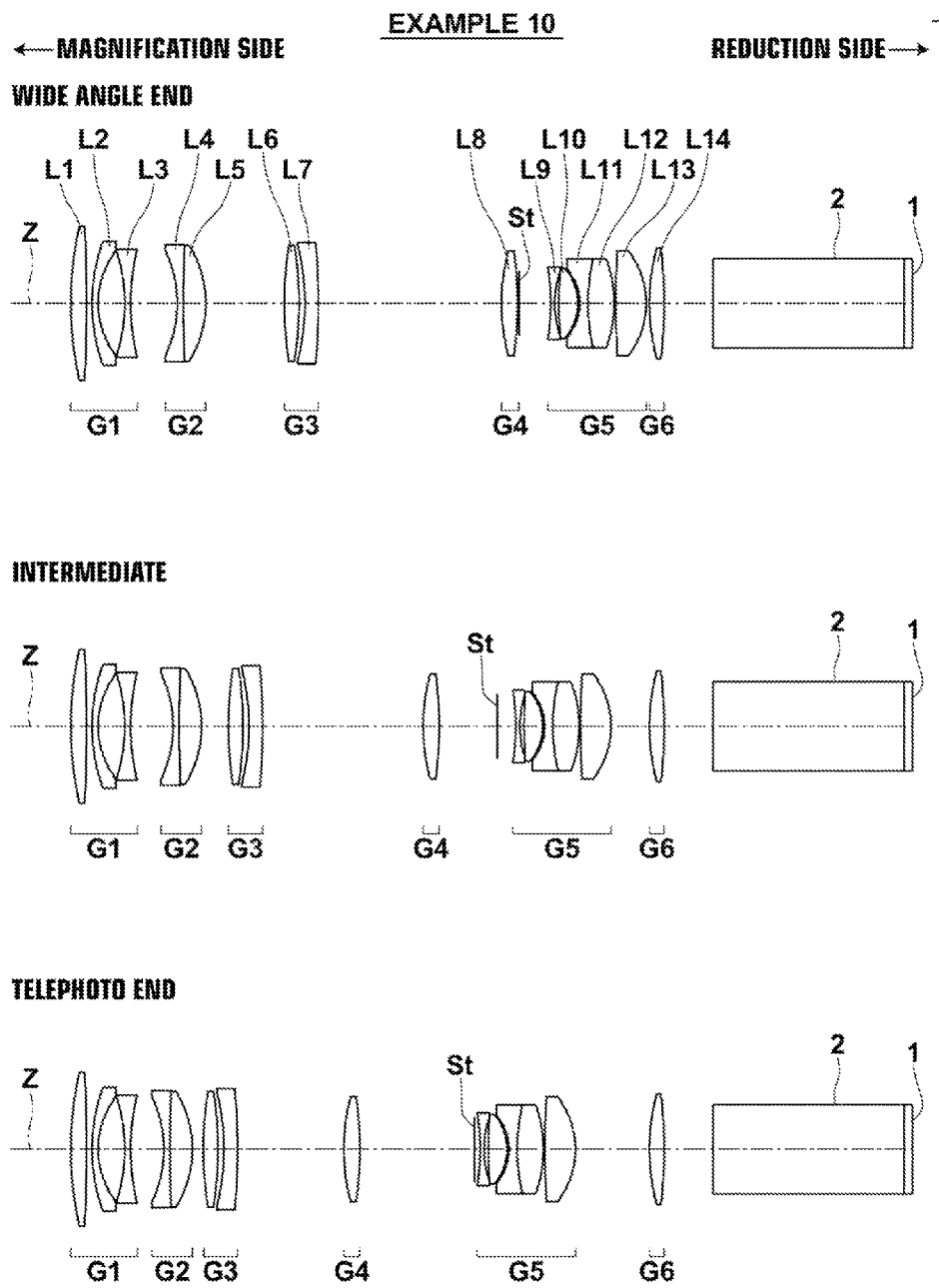
FIG. 10 is a collection of cross-sectional views of a projection zoom lens according to Example 10 of the present invention, illustrating the lens configuration thereof.

FIG. 10 shows a collection of the arrangement of the lens groups in the projection zoom lens of Example 10 at the wide angle end, the telephoto end, and the intermediate position therebetween.

In Example 10, the first lens group G1 consists of three lenses: a positive first lens L1, a negative second lens L2, and a negative third lens L3 disposed in this order from the magnification side. Further, the second lens group G2 consists of two lenses: a negative fourth lens L4 and a positive fifth lens L5 disposed in this order from the magnification side.

The third lens group G3 consists of two lenses: a positive sixth lens L6 and a negative seventh lens L7 disposed in this order from the magnification side. The fourth lens group G4 consists of one lens, a positive eighth lens L8.

An aperture stop St, which moves along the optical axis Z independently from the lens groups G4 and G5, is disposed between the reduction side of the fourth lens group G4 and the fifth lens group G5 to be described later. This aperture stop St is configured to be a movable stop which moves as described above and maintains the numerical aperture of the zoom lens constant over the entire zoom range.

Note that this aperture stop St has a constant aperture diameter, but the aperture stop St may be a variable stop which varies the aperture diameter to maintain the numerical aperture of the zoom lens constant as described above. However, it is not necessarily required for the aperture stop to have the functions of both the movable stop and the variable stop in the present invention. The aperture stop may have either one of these functions, or may have neither of them.

The fifth lens group G5 consists of five lenses: a negative ninth lens L9, a positive tenth lens L10, a negative eleventh lens L11, a positive twelfth lens L12, and a positive thirteenth lens L13 disposed in this order from the magnification side. The sixth lens group G6 consists of one lens, a positive fourteenth lens L14.

Note that the fourth lens L4 and the fifth lens L5 are cemented to each other, and the eleventh lens L11 and the twelfth lens L12 are cemented to each other as well.

Table 20 shows the basic lens data of the projection zoom lens of Example 10. Further, Table 21 shows the specs of the projection zoom lens of Example 10 at each of the wide angle end, the intermediate position, and the telephoto end while changing magnification in the same manner as in Table 2.

TABLE 20

Example 10: Basic Lens Data

| Si Surface Number | Ri Radius of Curvature | Di Distance Between Surfaces | Ndj Refractive Index | νdj Abbe Number |
|---|---|---|---|---|
| 1 | 52.0248 | 2.292 | 1.77250 | 49.60 |
| 2 | −224.4960 | 0.810 | | |
| 3 | 27.1867 | 0.884 | 1.72916 | 54.68 |
| 4 | 12.9092 | 3.868 | | |
| 5 | −24.9555 | 0.851 | 1.84666 | 23.78 |
| 6 | 33.2739 | DD[6] | | |
| 7 | −18.0197 | 0.871 | 1.61800 | 63.33 |
| 8 | 198.0251 | 3.273 | 1.62004 | 36.26 |
| 9 | −16.3825 | DD[9] | | |
| 10 | 54.5372 | 2.145 | 1.83400 | 37.16 |
| 11 | −54.5372 | 0.858 | | |
| 12 | −35.5941 | 1.986 | 1.51633 | 64.14 |
| 13 | −98.9794 | DD[13] | | |
| 14 | 30.3174 | 2.340 | 1.49700 | 81.54 |
| 15 | −55.7848 | DD[15] | | |
| 16(Aperture Stop) | ∞ | DD[16] | | |
| 17 | −34.6819 | 0.595 | 1.51742 | 52.43 |
| 18 | 14.9128 | 0.616 | | |
| 19 | 90.3520 | 2.725 | 1.48749 | 70.23 |
| 20 | −8.1243 | 0.277 | | |
| 21 | −7.6801 | 1.196 | 1.80400 | 46.57 |
| 22 | 28.1539 | 3.835 | 1.49700 | 81.54 |
| 23 | −19.0052 | 0.200 | | |
| 24 | 125.3300 | 4.457 | 1.49700 | 81.54 |
| 25 | −12.7151 | DD[25] | | |
| 26 | 31.7787 | 2.138 | 1.49700 | 81.54 |
| 27 | −70.6195 | 7.153 | | |
| 28 | ∞ | 27.804 | 1.51633 | 64.14 |
| 29 | ∞ | 1.192 | 1.50847 | 61.19 |
| 30 | ∞ | | | |

TABLE 21

Example 10: Data Regarding Zooming

|  | Wide Angle End | Intermediate Position | Telephoto End |
|---|---|---|---|
| Zoom Ratio | 1.00 | 1.30 | 1.67 |
| f | 10.00 | 13.00 | 16.70 |
| Bf | 26.28 | 26.28 | 26.28 |
| FNo. | 2.50 | 2.50 | 2.50 |
| 2ω[°] | 48.6 | 38.2 | 30.0 |
| DD[6] | 6.805 | 6.204 | 4.861 |
| DD[9] | 11.435 | 3.896 | 1.589 |
| DD[13] | 26.664 | 23.393 | 15.479 |
| DD[15] | 0.194 | 8.423 | 16.730 |
| DD[16] | 4.642 | 2.717 | 0.780 |
| DD[25] | 0.472 | 5.579 | 10.774 |
| Stop Diameter | 9.334 | 9.334 | 9.334 |

A through L of FIG. 20 respectively correspond to the aberration diagrams of the projection zoom lens of Example 10.

TABLE 22

| Conditional Formula | Example 1 | Example 2 | Example 3 | Example 4 | Example 5 |
|---|---|---|---|---|---|
| (1) m4/fw | 2.14 | 2.13 | 2.05 | 2.05 | 2.31 |
| (2) (m3 + m4)/(m2 + m3 + m4 + m5) | 0.74 | 0.81 | 0.8 | 0.82 | 0.78 |
| (3) f4/fw | 4.36 | 4.76 | 4.56 | 4.89 | 4.05 |
| (4) BF/Imφ | 2.94 | 2.94 | 2.94 | 2.94 | 2.94 |
| (5) L/Imφ | 9.79 | 10 | 10.08 | 9.78 | 9.78 |
| (6) νp | 81.54 | 81.54 | 81.54 | 81.54 | 81.54 |

TABLE 22-continued

| | Conditional Formula | Example 6 | Example 7 | Example 8 | Example 9 | Example 10 |
|---|---|---|---|---|---|---|
| (1) | m4/fw | 2.3 | 2.32 | 2.37 | 1.99 | 2.68 |
| (2) | (m3 + m4)/(m2 + m3 + m4 + m5) | 0.79 | 0.79 | 0.8 | 0.81 | 0.76 |
| (3) | f4/fw | 4.11 | 4.14 | 4.31 | 4.35 | 3.99 |
| (4) | Bf/Imφ | 2.94 | 2.94 | 2.94 | 2.88 | 2.94 |
| (5) | L/Imφ | 9.78 | 9.75 | 9.82 | 9.82 | 9.67 |
| (6) | νp | 81.54 | 81.54 | 81.54 | 61.14 | 81.54 |

TABLE 23

| Condition | Example 1 | Example 2 | Example 3 | Example 4 | Example 5 |
|---|---|---|---|---|---|
| Bf | 35.4911 | 35.5987 | 35.5108 | 35.4484 | 31.9965 |
| L | 118.1180 | 121.1110 | 121.7850 | 117.9140 | 106.364 |
| fw | 10.0005 | 10.0005 | 10.0008 | 9.9998 | 10 |
| ft | 14.3007 | 15.0008 | 15.0013 | 14.2998 | 15.8 |
| f1 | −17.7683 | −13.9168 | −11.7139 | −16.6366 | −16.6177 |
| f2 | 85.3750 | 81.3358 | 59.3529 | 94.5380 | 110.0414 |
| f3 | 121.4899 | 75.6714 | 69.3844 | 88.7924 | 66.289 |
| f4 | 43.6198 | 47.5872 | 45.6396 | 48.9154 | 40.5271 |
| f5 | −972.2548 | −246.3828 | −145.6741 | −4709.5096 | −447.5924 |
| fe | 53.5181 | 55.5823 | 52.9766 | 54.8670 | 49.4772 |
| m2 | 5.9540 | 2.5172 | 3.6386 | 1.9005 | 4.2048 |
| m3 | 19.3775 | 20.3608 | 19.2072 | 17.0428 | 19.01298 |
| m4 | 21.4232 | 21.3068 | 20.4641 | 20.4949 | 23.09332 |
| m5 | 8.6870 | 7.0889 | 6.5088 | 6.1801 | 7.7458 |
| Imφ | 12.0697 | 12.1076 | 12.0779 | 12.0564 | 10.8776 |

| Condition | Example 6 | Example 7 | Example 8 | Example 9 | Example 10 |
|---|---|---|---|---|---|
| Bf | 31.9961 | 26.2907 | 26.2845 | 24.356 | 26.2796 |
| L | 106.3362 | 87.138 | 87.736 | 83.193 | 86.429 |
| fw | 10 | 10.0001 | 9.9997 | 10.0001 | 9.9997 |
| ft | 15.8 | 16.7001 | 16.6995 | 16.6001 | 16.6995 |
| f1 | −16.9575 | −13.8 | −15.0471 | −11.87 | −14.755 |
| f2 | 123.4821 | 120.4954 | 134.2508 | 44.6308 | 145.2871 |
| f3 | 66.3592 | 41.7941 | 43.9077 | 42.945 | 46.9109 |
| f4 | 41.0852 | 41.3952 | 43.1319 | 43.4507 | 39.8817 |
| f5 | −584.0763 | 173.66 | 144.471 | −134.3045 | 611.5705 |
| fe | 50.1066 | 50.0865 | 49.3826 | 37.8731 | 44.4051 |
| m2 | 3.8704 | 1.1931 | 2.2009 | 2.7208 | 1.9438 |
| m3 | 18.6502 | 12.2474 | 12.3278 | 16.5432 | 11.7901 |
| m4 | 22.9862 | 23.2403 | 23.6497 | 19.9025 | 26.8375 |
| m5 | 7.0241 | 8.3644 | 6.8895 | 5.7087 | 10.3016 |
| Imφ | 10.8774 | 8.93708 | 8.93638 | 8.47022 | 8.93704 |

The present invention has been described with reference to the Embodiments and Examples. The projection zoom lenses of the present invention are not limited to the Examples above, and various modifications are possible. For example, values, such as the radii of curvature, the distances between surfaces, the refractive indices, and the Abbe numbers of the respective lenses can be changed as appropriate.

Further, the projection type display device of the present invention is also not limited to the configuration described above. For example, the light valves to be utilized and optical members used for the beam separation or beam composition are not limited to the above configurations, and various modifications are possible.

What is claimed is:

1. A projection zoom lens, in which the distances between respective adjacent lens groups change while changing magnification, consisting of a first lens group having a negative refractive power that is fixed while changing magnification, a second lens group having a positive refractive power that moves along the optical axis while changing magnification, a third lens group having a positive refractive power that moves along the optical axis while changing magnification, a fourth lens group having a positive refractive power that moves along the optical axis while changing magnification, a fifth lens group that moves along the optical axis while changing magnification, and a sixth lens group having a positive refractive power that is fixed while changing magnification, disposed in this order from the magnification side, wherein
the reduction side is configured to be telecentric;
the numerical aperture of the zoom lens is configured to be constant over the entire zoom range;
the amount of movement of the fourth lens group while changing magnification from the wide angle end to the telephoto end is the greatest among the amounts of movement of all of the lens groups;
an aperture stop is positioned at the reduction side of the third lens group and at the magnification side of the fifth lens group;
the third lens group includes a lens having a negative refractive power;
the fifth lens group includes a lens having a negative refractive power, a lens having a positive refractive power, and a lens having a negative refractive power arranged in this order from the magnification side; and
the projection zoom lens satisfies conditional formulas (1), (2), (3), (4), and (5) below:

$$1.9 < m4/fw \tag{1}$$

$$0.7 < (m3+m4)/(m2+m3+m4+m5) \tag{2}$$

$$3.0 < f4/fw < 5.5 \tag{3}$$

$$2.5 < Bf/Im\phi \tag{4}$$

$$L/Im\phi < 12 \tag{5}$$

where,
m2: the absolute value of the amount of movement of the second lens group while changing magnification from the wide angle end to the telephoto end,
m3: the absolute value of the amount of movement of the third lens group while changing magnification from the wide angle end to the telephoto end,
m4: the absolute value of the amount of movement of the fourth lens group while changing magnification from the wide angle end to the telephoto end,
m5: the absolute value of the amount of movement of the fifth lens group while changing magnification from the wide angle end to the telephoto end,
fw: the focal length of the entire system at the wide angle end,
f4: the focal length of the fourth lens group,
Bf: the back focus, which is an air converted length, at the reduction side of the entire system at the wide angle end,
Imφ: the maximum effective image circle diameter at the reduction side, and
L: the distance between the most-magnification-side lens surface and the most-reduction-side lens surface along the optical axis when the projection distance is infinite.

2. A projection zoom lens, in which the distances between respective adjacent lens groups change while changing magnification, consisting of a first lens group having a negative refractive power that is fixed while changing magnification, a second lens group having a positive refractive power that moves along the optical axis while changing magnification, a third lens group having a positive refractive power that moves along the optical axis while changing magnification, a fourth lens group having a positive refractive power that moves along the optical axis while changing magnification, a fifth lens group that moves along the optical axis while changing magnification, and a sixth lens group having a positive refractive power that is fixed while changing magnification, disposed in this order from the magnification side, wherein the fifth lens group has a negative refractive power;
the reduction side is configured to be telecentric;
the numerical aperture of the zoom lens is configured to be constant over the entire zoom range;
the amount of movement of the fourth lens group while changing magnification from the wide angle end to the telephoto end is the greatest among the amounts of movement of all of the lens groups;
an aperture stop is positioned at the reduction side of the third lens group and at the magnification side of the fifth lens group;
the third lens group includes a lens having a negative refractive power;
the fifth lens group includes a lens having a negative refractive power, a lens having a positive refractive power, and a lens having a negative refractive power arranged in this order from the magnification side; and
the projection zoom lens satisfies conditional formulas (1), (3), (4), and (5) below:

$$1.9 < m4/fw \quad (1)$$

$$3.0 \le f4/fw < 5.5 \quad (3)$$

$$2.5 < Bf/Im\phi \quad (4)$$

$$L/Im\phi < 12 \quad (5),$$

where,
m4: the absolute value of the amount of movement of the fourth lens group while changing magnification from the wide angle end to the telephoto end, and
fw: the focal length of the entire system at the wide angle end
f4: the focal length of the fourth lens group,
Bf: the back focus, which is an air converted length, at the reduction side of the entire system at the wide angle end,
Imφ: the maximum effective image circle diameter at the reduction side, and
L: the distance between the most-magnification-side lens surface and the most-reduction-side lens surface along the optical axis when the projection distance is infinite.

3. The projection zoom lens of claim 2 that satisfies conditional formula (2) below:

$$0.7 < (m3+m4)/(m2+m3+m4+m5) \quad (2),$$

where,
m2: the absolute value of the amount of movement of the second lens group while changing magnification from the wide angle end to the telephoto end,
m3: the absolute value of the amount of movement of the third lens group while changing magnification from the wide angle end to the telephoto end,
m4: the absolute value of the amount of movement of the fourth lens group while changing magnification from the wide angle end to the telephoto end, and
m5: the absolute value of the amount of movement of the fifth lens group while changing magnification from the wide angle end to the telephoto end.

4. The projection zoom lens of claim 1 that satisfies conditional formula (3') below is satisfied:

$$3.5 \le f4/fw < 5.0 \quad (3').$$

5. The projection zoom lens of claim 2 that satisfies conditional formula (3') below:

$$3.5 \le f4/fw < 5.0 \quad (3').$$

6. The projection zoom lens of claim 1, wherein the aperture stop is a variable stop that varies the aperture diameter while changing magnification.

7. The projection zoom lens of claim 2, wherein the aperture stop is a variable stop that varies the aperture diameter while changing magnification.

8. The projection zoom lens of claim 1, wherein the aperture stop moves along the optical axis independently from the other lenses while changing magnification.

9. The projection zoom lens of claim 2, wherein the aperture stop moves along the optical axis independently from the other lenses while changing magnification.

10. The projection zoom lens of claim 1, wherein the third lens group through the fifth lens group move toward the magnification side monotonically while changing magnification from the wide angle end to the telephoto end.

11. The projection zoom lens of claim 2, wherein the third lens group through the fifth lens group move toward the magnification side monotonically while changing magnification from the wide angle end to the telephoto end.

12. The projection zoom lens of claim 1 that satisfies conditional formulas (5') below:

$$8 < L/Im\phi < 11 \quad (5').$$

13. The projection zoom lens of claim 2 that satisfies conditional formula (5') below:

$$8 < L/Im\phi < 11 \quad (5').$$

14. The projection zoom lens of claim 1, wherein the second lens group includes a lens having a negative refractive power.

15. The projection zoom lens of claim 2, wherein the second lens group includes a lens having a negative refractive power.

16. The projection zoom lens of claim 1, wherein the fourth lens group includes a lens having a positive refractive power, conditional formula (6) below is satisfied:

$$60 < vp \quad (6),$$

where,
vp: the Abbe number of the medium of the lens having a positive refractive power within the fourth lens group.

17. The projection zoom lens of claim 16 that satisfies conditional formula (6') below:

$$70 < vp \quad (6').$$

18. The projection zoom lens of claim 2, wherein the fourth lens group includes a lens having a positive refractive power; and
Conditional formula (6) below is satisfied:

$$60 < vp \quad (6),$$

where,
vp: the Abbe number of the medium of the lens having a positive refractive power within the fourth lens group.

19. A projection type display device comprising:
a light source;
a light valve into which light from the light source enters;
the projection zoom lens of claim 1 that projects an optical image formed by the light modulated by the light valve onto a screen.

20. A projection type display device comprising:
a light source;
a light valve into which light from the light source enters;
the projection zoom lens of claim 2 that projects an optical image formed by the light modulated by the light valve onto a screen.

* * * * *